United States Patent
Contractor et al.

(10) Patent No.: US 11,026,433 B2
(45) Date of Patent: Jun. 8, 2021

(54) 3D-PRINTER SYSTEM WITH OBJECT DETECTION SENSORS

(71) Applicant: BeeHex, LLC, Columbus, OH (US)

(72) Inventors: Anjan Contractor, Cypress, TX (US); Benjamin Feltner, Blacklick, OH (US)

(73) Assignee: BeeHex, LLC, Columbus, OH (US)

( * ) Notice: Subject to any disclaimer, the term of this patent is extended or adjusted under 35 U.S.C. 154(b) by 103 days.

(21) Appl. No.: 16/247,363

(22) Filed: Jan. 14, 2019

(65) Prior Publication Data

US 2019/0142020 A1 May 16, 2019

Related U.S. Application Data

(63) Continuation of application No. 15/655,865, filed on Jul. 20, 2017, now Pat. No. 10,178,868, which is a
(Continued)

(51) Int. Cl.
*A21D 13/41* (2017.01)
*B29C 64/245* (2017.01)
(Continued)

(52) U.S. Cl.
CPC ............. *A21D 13/41* (2017.01); *A21D 13/47* (2017.01); *A23L 33/10* (2016.08); *A23L 33/30* (2016.08);
(Continued)

(58) Field of Classification Search
CPC ......... A21D 13/41; A21D 13/47; A23L 33/10; A23L 33/30; A23L 33/40;
(Continued)

(56) References Cited

U.S. PATENT DOCUMENTS 9,552,915 B2   1/2017   Khan et al.
9,649,814 B2   5/2017   Yeh
(Continued)

FOREIGN PATENT DOCUMENTS

CN   103315371 A   9/2013
CN   203841022 U   9/2014
(Continued)

OTHER PUBLICATIONS

Baumann et al, Vision based error detection for 3D printing processes, 2016, MATEC Web of Conferences, p. 1-7) (Year: 2016).*
(Continued)

*Primary Examiner* — Kidest Bahta
(74) *Attorney, Agent, or Firm* — Rutan & Tucker, LLP; Kyle M. St. James

(57) ABSTRACT

A three-dimensional (3D) printer system is disclosed. The 3D-printer system comprises an extruder, a housing configured to house the extruder, a 3D-printer base including a print bed, the print bed configured to receive material extruded from the extruder, and a first sensor configured to detect a location of an object on the print bed. In some embodiments, the 3D-printer system further comprises a plurality of sensors coupled to the housing or to the extruder, the plurality of sensors including the first sensor, wherein the plurality of sensors are configured to obtain data for detection of the location of the object. In yet some embodiments, the 3D-printer system of claim further comprises a processor and a non-transitory, computer-readable medium having stored thereon logic, the logic when executed performs operations including receiving data from the first sensor and detecting the location of the object on the print bed based on the data.

20 Claims, 22 Drawing Sheets

Related U.S. Application Data continuation-in-part of application No. 15/587,306, filed on May 4, 2017, now Pat. No. 10,349,663.

(60) Provisional application No. 62/364,862, filed on Jul. 21, 2016.

(51) Int. Cl.

| | | |
|---|---|---|
| *B33Y 80/00* | (2015.01) | |
| *B33Y 70/00* | (2020.01) | |
| *B33Y 40/00* | (2020.01) | |
| *A21D 13/47* | (2017.01) | |
| *B29C 64/35* | (2017.01) | |
| *B29C 64/25* | (2017.01) | |
| *A23L 33/00* | (2016.01) | |
| *A23L 33/10* | (2016.01) | |
| *B33Y 10/00* | (2015.01) | |
| *B33Y 50/00* | (2015.01) | |
| *A23P 20/20* | (2016.01) | |
| *A23P 20/25* | (2016.01) | |

(52) U.S. Cl.
CPC .............. *A23L 33/40* (2016.08); *A23P 20/20* (2016.08); *B29C 64/245* (2017.08); *B29C 64/25* (2017.08); *B29C 64/35* (2017.08); *B33Y 10/00* (2014.12); *B33Y 40/00* (2014.12); *B33Y 50/00* (2014.12); *B33Y 70/00* (2014.12); *B33Y 80/00* (2014.12); *A23P 2020/253* (2016.08)

(58) Field of Classification Search
CPC .. A23P 2020/253; A23P 20/20; B29C 64/245; B29C 64/25; B29C 64/35; B33Y 10/00; B33Y 40/00; B33Y 50/00; B33Y 70/00; B33Y 80/00

See application file for complete search history.

(56) References Cited

U.S. PATENT DOCUMENTS

| | | | |
|---|---|---|---|
| 10,178,868 | B2 | 1/2019 | Contractor et al. |
| 2004/0265413 | A1* | 12/2004 | Russell ................ B29C 64/112 425/375 |
| 2010/0140852 | A1* | 6/2010 | Kritchman ............ B33Y 30/00 264/494 |
| 2011/0236552 | A1 | 9/2011 | Vink |
| 2012/0168985 | A1 | 7/2012 | Klaber |
| 2012/0251688 | A1 | 10/2012 | Zimmerman et al. |
| 2014/0065194 | A1* | 3/2014 | Yoo ..................... B29C 64/165 424/400 |
| 2014/0120195 | A1 | 5/2014 | Ploskonka |
| 2014/0154378 | A1 | 6/2014 | von Hasseln et al. |
| 2014/0288699 | A1 | 9/2014 | Williams et al. |
| 2015/0032241 | A1 | 1/2015 | Lee et al. |
| 2015/0145174 | A1 | 5/2015 | Comb |
| 2015/0197063 | A1 | 7/2015 | Shinar et al. |
| 2015/0253761 | A1 | 9/2015 | Nelson et al. |
| 2015/0287123 | A1 | 10/2015 | Holman et al. |
| 2016/0000139 | A1 | 1/2016 | Mou et al. |
| 2016/0066601 | A1 | 3/2016 | Herr et al. |
| 2016/0067740 | A1 | 3/2016 | Voris et al. |
| 2016/0067866 | A1 | 3/2016 | Sekar et al. |
| 2016/0075089 | A1* | 3/2016 | Duro Royo ........... B29C 64/106 264/308 |
| 2016/0082652 | A1 | 3/2016 | Snyder et al. |
| 2016/0100621 | A1 | 4/2016 | Diaz et al. |
| 2016/0106142 | A1 | 4/2016 | Contractor et al. |
| 2016/0135493 | A1 | 5/2016 | Kuo et al. |
| 2016/0278427 | A1 | 9/2016 | Davila et al. |
| 2016/0297149 | A1 | 10/2016 | Albert et al. |
| 2016/0303801 | A1 | 10/2016 | Chang et al. |
| 2016/0330992 | A1 | 11/2016 | Von Hasseln et al. |
| 2016/0338545 | A1 | 11/2016 | Shah et al. |
| 2017/0001378 | A1* | 1/2017 | Zheng .................. B33Y 30/00 |
| 2017/0099867 | A1 | 4/2017 | Corthesy-Malnoe et al. |
| 2017/0109925 | A1 | 4/2017 | Gritzky et al. |
| 2017/0120527 | A1 | 5/2017 | Miller et al. |
| 2017/0134716 | A1 | 5/2017 | Naito |
| 2017/0148348 | A1 | 5/2017 | Hardee et al. |
| 2018/0020683 | A1 | 1/2018 | Contractor et al. |
| 2018/0042245 | A1 | 2/2018 | Contractor et al. |

FOREIGN PATENT DOCUMENTS

| | | |
|---|---|---|
| CN | 204070482 U | 1/2015 |
| CN | 104365954 A | 2/2015 |
| CN | 103720021 B | 5/2015 |
| CN | 204635061 U | 9/2015 |
| CN | 204653736 U | 9/2015 |
| CN | 204682494 U | 10/2015 |
| CN | 105196553 A | 12/2015 |
| CN | 105394801 A | 3/2016 |
| CN | 205492576 U | 8/2016 |
| CN | 105922582 A | 9/2016 |
| EP | 3162474 A1 | 5/2017 |
| TW | M511764 U | 11/2015 |
| TW | 201700156 A | 1/2017 |
| WO | 2014/190168 A1 | 11/2014 |
| WO | 2015115897 A1 | 8/2015 |
| WO | 2016033842 A1 | 3/2016 |
| WO | 2016150960 A1 | 9/2016 |
| WO | 2016161276 A1 | 10/2016 |
| WO | 2017006330 A1 | 1/2017 |
| WO | 2017039858 A1 | 3/2017 |
| WO | 2017075277 A1 | 5/2017 |
| WO | 2017081040 A1 | 5/2017 |

OTHER PUBLICATIONS

Lipton et al., Additive manufacturing fo the food industry, 2015, Trends in Food Science & Technology p. 114-123 (Year: 2015).*
3D Printer G-Codes website, [https://3dprinterchat.com/2016/02/3d-printer-g-codes/], last accessed Aug. 30, 2017.
PCT/US2017/043270 filed Jul. 21, 2017 International Search Report and Written Opinion dated Sep. 27, 2017.
U.S. Appl. No. 15/587,306, filed May 4, 2017 Non-Final Office Action dated Dec. 21, 2018.
U.S. Appl. No. 15/655,865, filed Jul. 20, 2017 Notice of Allowance dated Aug. 28, 2018.

* cited by examiner

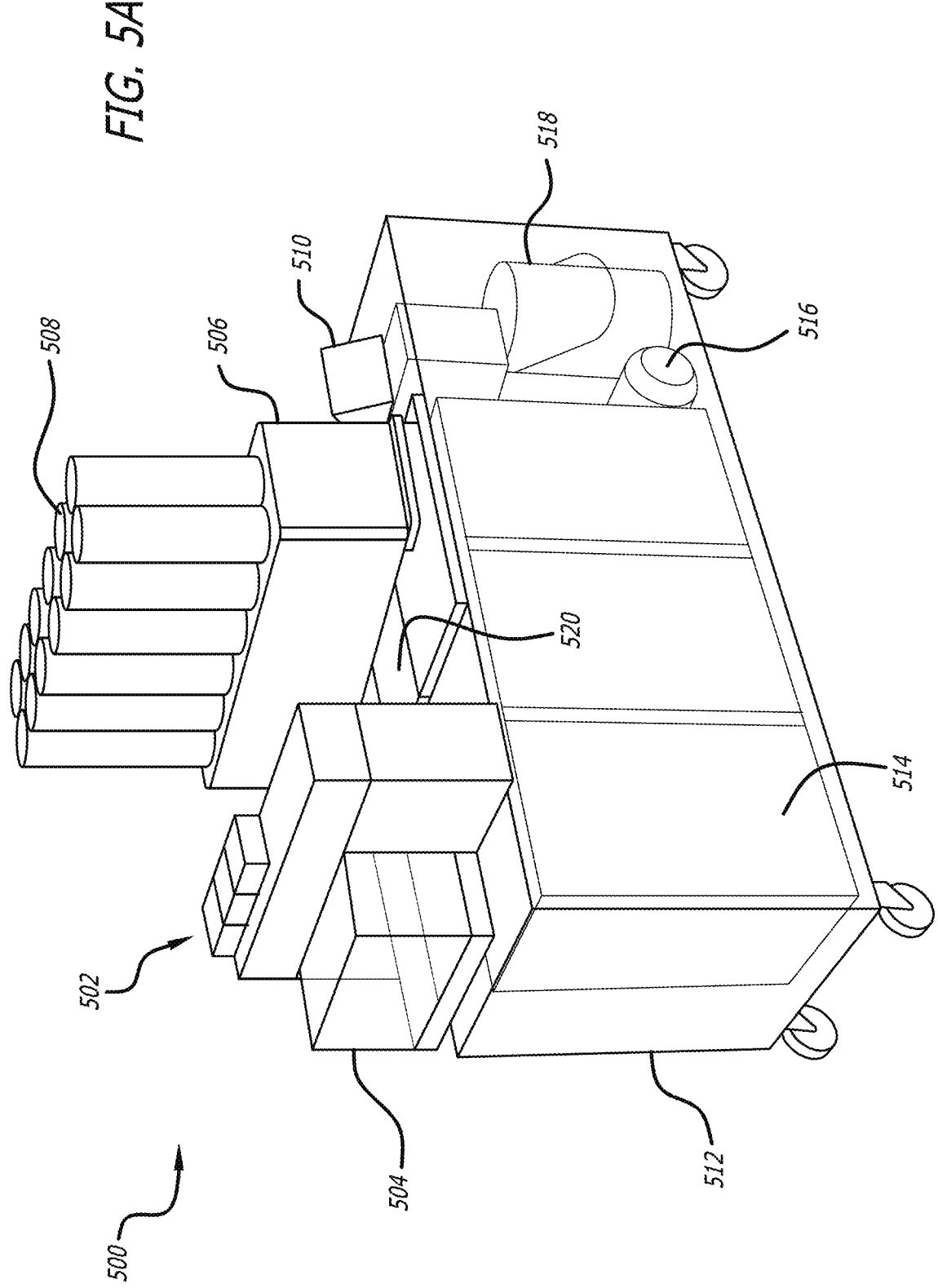

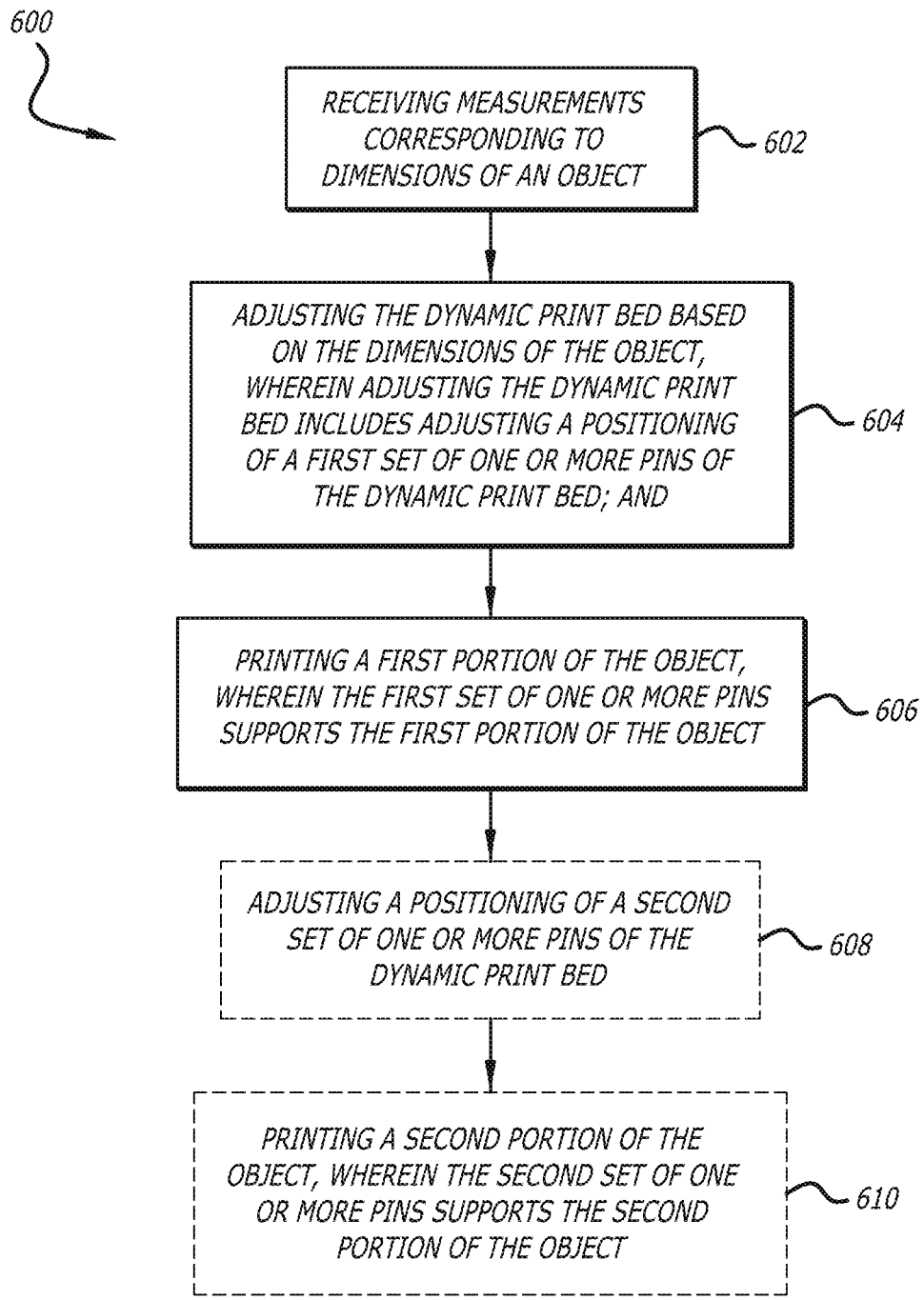

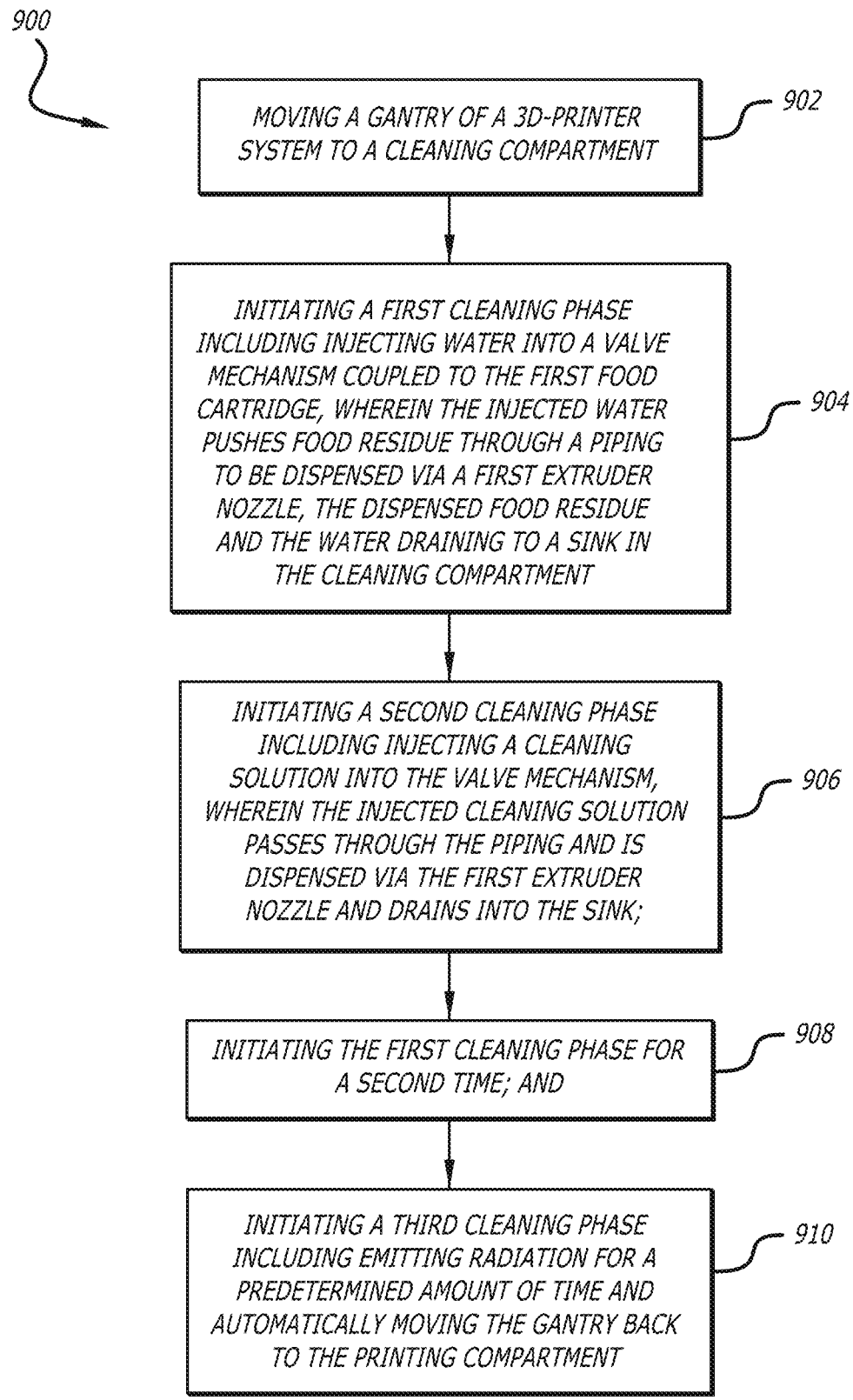

1502 — RECEIVING INPUT CORRESPONDING TO DIMENSIONS OF AN OBJECT ON A PRINT BED WITHIN A CLEANING COMPARTMENT OF THE 3D-PRINTER SYSTEM;

1504 — TRANSPORTING, BY THE 3D-PRINTER SYSTEM, THE OBJECT FROM THE PRINTING COMPARTMENT TO THE TOPPING COMPARTMENT OF THE PRINT SYSTEM, WHEREIN THE TOPPING COMPARTMENT INCLUDES A FIRST DISPENSING UNIT HAVING AN AUGER-BASED DISPENSING MECHANISM;

1506 — GENERATING, BY ONE OR MORE LOGIC MODULES OF THE PRINT SYSTEM, ONE OR MORE INSTRUCTIONS INCLUDING POSITIONING INFORMATION OF THE OBJECT TO ALIGN THE OBJECT WITH THE FIRST DISPENSING UNIT;

1508 — MOVING, BY A MOTOR OF THE PRINT SYSTEM, THE BASE OF THE TOPPING COMPARTMENT TO ALIGN THE OBJECT WITH THE FIRST DISPENSING UNIT; AND

1510 — DISPENSING A FIRST TOPPING VIA THE FIRST DISPENSING UNIT

1512 — TRANSPORTING, BY THE TOPPING COMPARTMENT, THE OBJECT FROM THE TOPPING COMPARTMENT TO A CURING COMPARTMENT OF THE PRINT SYSTEM

1514 — CURING AT LEAST A PORTION OF THE OBJECT

1702 — PRINTING A FIRST PORTION OF AN OBJECT ACCORDING TO ONE OR MORE CODES, WHEREIN THE PRINTING IS PERFORMED IN A PRINTING COMPARTMENT OF THE 3D-PRINTER SYSTEM, THE PRINTING COMPARTMENT INCLUDING ONE OR MORE EXTRUDERS;

1704 — TRANSPORTING, BY THE PRINT SYSTEM, THE FIRST PORTION OF THE OBJECT TO THE CURING COMPARTMENT OF THE PRINT SYSTEM;

1706 — CURING, BY A FIRST CURING MECHANISM OF THE 3D-PRINTER SYSTEM, THE FIRST PORTION OF THE OBJECT;

1708 — TRANSPORTING, BY THE PRINT SYSTEM, THE FIRST PORTION OF THE OBJECT TO THE PRINTING COMPARTMENT; AND

1710 — PRINTING A SECOND PORTION OF THE OBJECT ON AN EXTERIOR OF THE FIRST PORTION OF THE OBJECT TO CREATE A FINISHED OBJECT

3D-PRINTER SYSTEM WITH OBJECT DETECTION SENSORS

CROSS-REFERENCE TO RELATED APPLICATIONS

This application is a continuation of U.S. patent application Ser. No. 15/655,865, filed Jul. 20, 2017, which is a continuation-in-part of U.S. patent application Ser. No. 15/587,306, filed May 4, 2017, which claims the benefit of priority to U.S. Provisional Application No. 62/364,862, filed Jul. 21, 2016, the entire contents of which are incorporated by reference herein.

TECHNICAL FIELD

Embodiments of the disclosure relate generally to generating objects using a 3D-printer system. Embodiments relate more particularly to systems and methods for printing an edible object using a 3D-printer system having one or more sensors coupled thereto that are configured to obtain data and, based on the data, detect an object on a print bed of the 3D-printer system.

BACKGROUND

A pizza is a flatbread generally topped with tomato sauce, toppings and cheese, baked in an oven. Today, pizza has become a favorite cuisine among numerous people. However, pizzas have been criticized as having an unhealthy balance of ingredients. Pizzas can be high in salt, fat and food energy.

Typically, pizzas come in a circular shape. Some pizza restaurants offer a limited number (two or three) of pizza sizes. As a result, it becomes almost impossible to configure a pizza to a specific calorie requirement or make a pizza crust of different ingredients.

In light of the above discussion, there appears to be a system and method for customizing and making pizzas on a pizza maker.

Among one of the most challenging and important factors related to the consumer health and safety is a 3D-printer system's ability to be cleaned without leaving traces of microorganisms. For example, connections or couplings within the food path of current systems, disconnects, luer fittings and NPT fittings are present, which provide opportunities for food residue to remain after printing. In several areas within the food path of current systems, viscous food may be reefed around the cracks and, as a result, cannot be cleaned easily with unidirectional hot water and detergent cleaning. Additionally, viscous food may end up being stuck around the outer surface of a print nozzle of current systems, which requires frequent manual cleaning. When a user forgets to clean outer surface of the print nozzle, opportunities are created for microorganism growth. Frequently, biofilm formation is observed around poorly cleaned disconnects, luer fittings, national pipe threading (NPT) fittings and print nozzles. Microorganisms on wet surfaces have the ability to aggregate, grow into microcolonies, and produce biofilm. Growth of biofilms in food processing environments leads to increased opportunity for microbial contamination of the processed product. These biofilms may contain spoilage and pathogenic microorganisms. Microorganisms within biofilms are protected from sanitizers increasing the likelihood of survival and subsequent contamination of food. This increases the risk of reduced shelf life and disease transmission Currently systems may regularly dispose of all parts that come into physical contact with food including food pipes, couplers and nozzles to prevent microorganism contamination, which can become very expensive. Thus, what is needed is a proper and permanent automatic cleaning system within a 3D-printer system that ensures no biofilm formation, removes food residue within tubing and print nozzles in an affordable manner.

OBJECT OF THE INVENTION

An object of the embodiments herein is to provide a system (e.g., a 3D-printer system that may print, inter alia, pizza) to enable printing of, inter alia, edible objects, including but not limited or restricted to, a pizza crust, sauce, cheese in any shape, size and thickness.

Another object of the embodiments herein is to use a 3D-printing technology to automatically create various layers of, inter alia, edible objects, including but not limited or restricted to, pizza and with customized requirements.

Another object of the embodiments herein is to provide a method to allow a consumer to communicate with the system and provide customized requirements.

Another object of the embodiments herein is to provide a method, an apparatus and a system to use 3D printing technology with a 3D-printer system having a print bed that is dynamically adjustable according to dimensions of an object to be printed or an object onto which the exterior is to be printed.

Another object of the embodiments herein is to provide a method, an apparatus and a system to use 3D printing technology with a 3D-printer system having one or more sensors to detect dimensions of an object placed, or printed, on a print bed and print on the exterior of the object according to the detected dimensions.

Another object of the embodiments herein is to provide a method, an apparatus and a system to use 3D printing technology with a 3D-printer system having a robotic mechanism configured to grip an object on a print bed and adjust a positioning of the object.

Another object of the embodiments herein is to provide a method, an apparatus and a system to use 3D printing technology with a 3D-printer system configured with an auto-clean procedure and optionally having a printing compartment and a cleaning compartment into which the one or more extruders are transported prior to the initiation of the auto-clean procedure.

Another object of the embodiments herein is to provide a method, an apparatus and a system to use 3D printing technology with a 3D-printer system configured to print edible objects according to a plurality of inputs including a prescribed diet (e.g., from a physician or dietician), physiological measurements (e.g., from one or more wearables), dietary restrictions, etc.

Another object of the embodiments herein is to provide a method, an apparatus and a system to use 3D printing technology with a 3D-printer system having a robotic topping mechanism.

Another object of the embodiments herein is to provide a method, an apparatus and a system to use 3D printing technology with a 3D-printer system having an integrated curing mechanism, that, optionally, is located within a curing compartment of the 3D-printer system.

SUMMARY

An example of the computer-implemented method for customizing pizzas on a mobile device and preparing on a pizza maker includes receiving a plurality of inputs from a user by allowing the user to draw, configure and order one or more pizzas through a graphical interface on a mobile device. Further, the computer-implemented method includes sending the inputs wirelessly to a server. Furthermore, the computer-implemented method includes identifying an appropriate 3D food printer and subsequently sending the inputs from the server to the 3D food printer. Moreover, the computer-implemented method includes allowing the 3D food printer to decide a crust, sauce and cheese based on the inputs. The computer-implemented method includes instructing the 3D food printer to form the pizza by printing a plurality of ingredients layer-by-layer thereby providing granularity in shape, size and thickness for the ingredients.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Additionally, adequate nutrition is a basic necessity for persons that are very physically active, e.g., soldiers, in order for the active person to achieve optimal performance and maintain high morale. Currently, soldiers located on various bases throughout the world, e.g., on a Forward Operating Base (FOB), consume pre-packaged Meals Ready to Eat (MRE), which may be inadequate in providing sufficient nutrition for the level of physical activity these soldiers routinely perform. These MREs are limited in choices of flavors or food-types, have limited nutritional value and are not tailored to each individual's nutrient needs. There is also a significant problem with supplying special nutrition to soldiers who become ill, dehydrated, or fatigued. Hence, a personalized diet for each soldier fighting in FOB is necessary. A system that can produce personalized diets based on soldiers' physiological needs and taste preferences will not only increase their morale but also increase effectiveness in day-to-day activities.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

FIG. 1 block diagram of an environment, according to the embodiments as disclosed herein;

FIG. 5A is an exemplary illustration of a 3D-printer system.

FIG. 6 is an exemplary flowchart of a method of printing an object utilizing a 3D-printer system having a dynamic print bed.

FIG. 9 is an exemplary flowchart of a method of implementing an auto-clean procedure of a 3D-printer system.

FIG. 15 is an exemplary flowchart of operations of a robotic topping mechanism performed during the process of printing an edible object.

FIG. 17 is an exemplary flowchart of a method of curing at least a portion of a printed edible material with a 3D-printer system.

Figure 1:
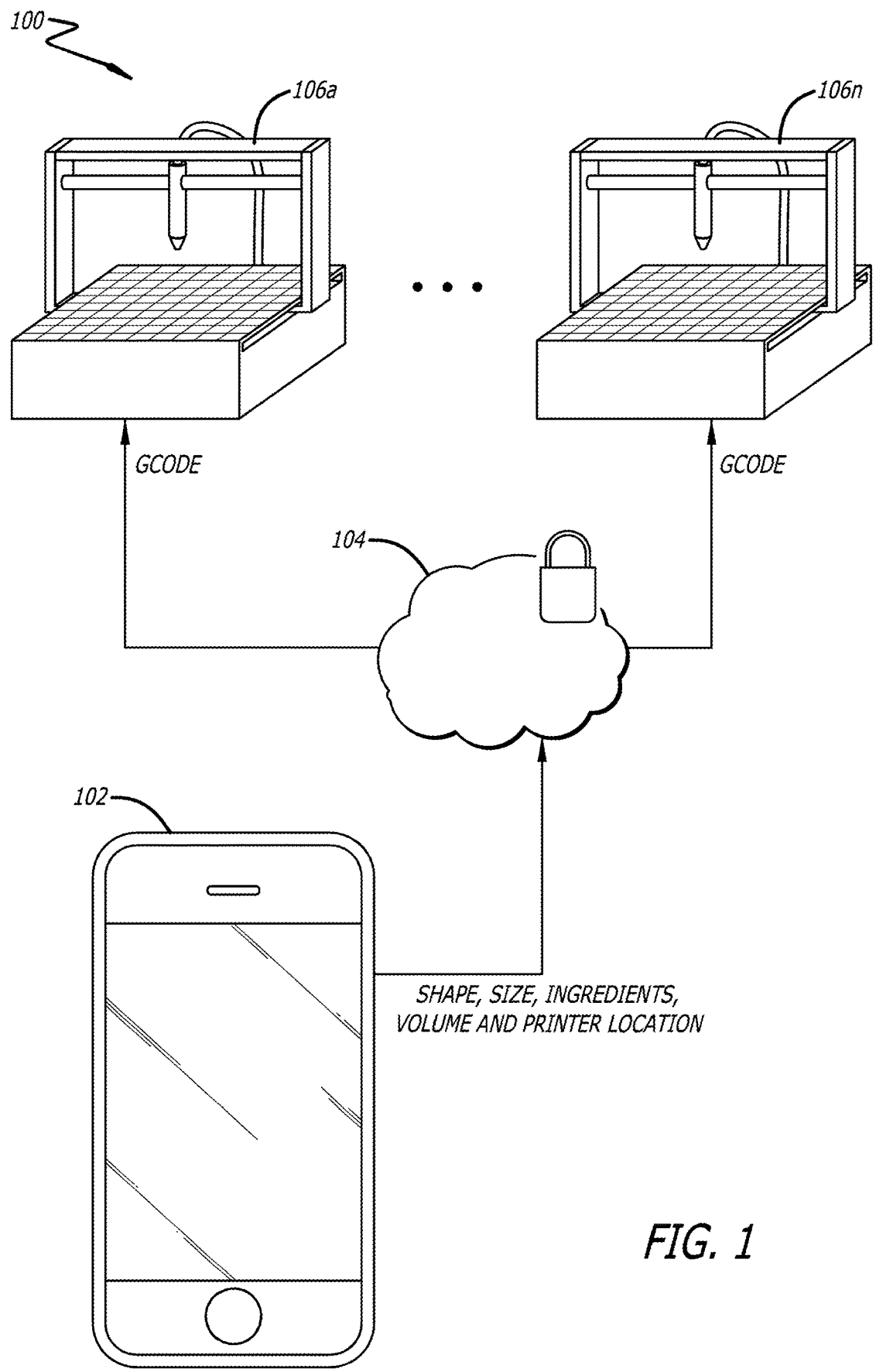

DETAILED DESCRIPTION OF THE EMBODIMENTS 3D-printing of edible objects and robotics technology holds promise for food management companies and restaurants in providing higher efficiency and personalization to consumers. Specifically, food cartridges with various nutrients can be loaded into a 3D-printer system, which may be programmed to create edible foods corresponding to a personalized diet for an individual based on physiological needs, a level of activity and genetic composition. Consumers can personalize their diet using an analysis platform and share their coded recipes on the internet. Such a platform has the potential to change the edible objects (e.g., food) is created, shares and consumed. Additionally, the analysis platform may recommend dietary needs to patients of certain disease, food allergies, and physical condition or to athletes trying to achieve performance based milestones.

In the following description, certain terminology is used to describe various features of the invention. For example, each of the terms "logic" and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

Herein, a "communication" generally refers to related data that is received, transmitted, or exchanged within a communication session. The data may include a plurality of packets, where a "packet" broadly refers to a series of bits or bytes having a prescribed format. Alternatively, the data may include a collection of data that may take the form of an individual or a number of packets carrying related payloads, e.g., a single webpage received over a network.

The term "computerized" generally represents that any corresponding operations are conducted by hardware in combination with software and/or firmware.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The above-mentioned needs are met by a method, system and apparatus for printing customized object, e.g., edible objects, with the 3D-printer system disclosed herein. The following detailed description is intended to provide example implementations to one of ordinary skill in the art, and is not intended to limit the invention to the explicit disclosure, as one of ordinary skill in the art will understand that variations can be substituted that are within the scope of the invention as described.

FIG. 1 block diagram of an environment, according to the embodiments as disclosed herein. The environment 100 includes a computing device 102, a server 104 and a plurality of 3D food printers, for example, 3D food printer 106a and 3D food printer 106n.

Examples of the computing device 102 includes, but is not limited to, personal digital assistants, cellular telephones, smart phones, tablets and other similar computing devices. In a specific context, the computing device 102 is a smart phone. Specifically, the computing device 102 is operated by a user (not shown in FIG. 1) who desires to customize a pizza. In some embodiments, the computing device 102 may be operated by a restaurant owner.

A computer program product (herein referred to as a "mobile application") is tangibly embodied in the computing device 102. The computer program product also contain instructions that when executed perform the method described herein. Typically, the mobile application provides a very easy to use and intuitive graphical interface for the users (consumers) to design, configure and order their pizza. Further, the mobile application allows the user to pick a location to prepare the pizza and subsequently picks up the pizza from the appropriate 3D food printer.

The server 104 may also be referred to as a BeeHex server. The server 104 maintains a database (not shown in FIG. 1) of the status of each of the printer like (the printer queue, time it would take till the next order, ingredient levels and so on). Further, the server 104 consolidates all the orders from users and routes it to the appropriate 3D food printer location. The server 104 also stores GCODES that are sent to the 3D food printers.

The 3D food printers are configured with a 3D printer software that connects to the server 104 and regularly pulls the order received. The 3D food printers are built using a drip-proof extruder system. Additionally, the 3D printer software keeps a track of when the ingredients were loaded into the 3D food printer and the amount consumed and amount left. A local queue of orders is also maintained and sequentially sends each order to the 3D food printer.

Further, the 3D food printers are controlled using the configurations stored in the server 104. The configurations includes critical information required to print a pizza, for instance, shape, ingredients, number of layers of each of the ingredients, thickness of each of the ingredients and so on. The configurations are converted into small code (also referred to as key).

At first, a user selects a specific thickness and width for a pizza. Pointers are then generated that selects and compiles GCODES. Subsequently, a pointer is created that acts as a key to find files on the server. Upon identification of various GCODES, an algorithm stacks up the GCODES and sends them (as a single file) to an appropriate 3D printer. A 3D printer store will put this file in a queue and will then go to the appropriate 3D printer.

The information collected from the users is sent to the server 104. Subsequently, the server 104 identifies the appropriate 3D food printer and sends the information in a protocol that the 3D food printer recognizes. The 3D food printer is identified with its unique identifier (ID) with the server 104. The server 104 uses this ID to identify an appropriate 3D food printer and subsequently sends pizza configurations and print commands to the identified 3D food printer. In other words, the inputs provided by the user (through the graphical interface) are converted to computer-aided-design (CAD) drawings and G-Code (RS-274) language required for the computer aided manufacturing system (3D food printer).

The 3D food printer then prepares the pizza based on the configurations thereby providing a customized experience to the user. The user may then go to the appropriate location of the 3D food printer and collect his/her customized pizza.

Figure 2:
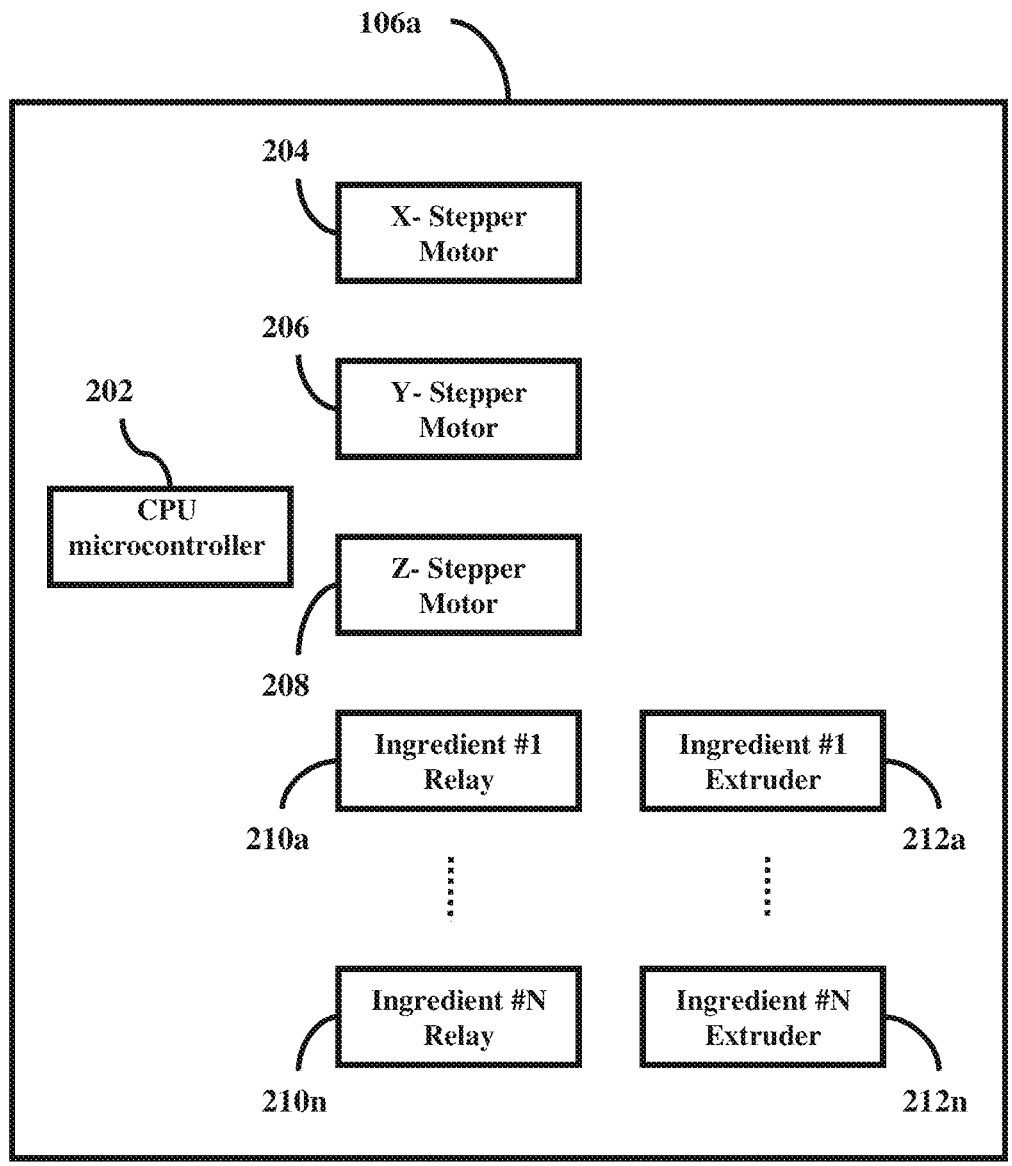
FIG. 2 is a block diagram of a 3D food printer, according to the embodiments as disclosed herein.

FIG. 2 is a block diagram of a 3D food printer, according to the embodiments as disclosed herein. The 3D food printer 106a includes a microcontroller (CPU microcontroller) 202 that controls three stepper motors (X-Stepper Motor 204, Y-Stepper Motor 206 and Z-Stepper Motor 208) and relays (Ingredient #1 relay 210a and Ingredient #2 relay 210n). Typically, there are two relays for each ingredient. For instance, for three ingredients (one dough, one sauce and one cheese), there will be at least six relays. The relays in turn control the extruder (Ingredient #1 Extruder 212a and Ingredient #N Extruder 212n) for the various ingredients. In some embodiments, more than three stepper motors may be used.

The three stepper motors (X-Stepper Motor 204, Y-Stepper Motor 206 and Z-Stepper Motor 208) move over a base plate (not shown in FIG. 2). The X-Stepper Motor 204 controls the base plate. The Y-Stepper Motor 206 controls a top arm. The top arm/assembly (not shown in FIG. 2) holds the tubes (not shown in FIG. 2) with the food ingredients. Further, the Z-Stepper Motor 208 provides the Z-axis movement of the top arm.

Typically, the microcontroller 202 aligns the extruder nozzle (not shown in FIG. 2) and the base plate appropriately to recreate the exact shape. The microcontroller 202 enables and/or disables the relays appropriately so the exact desired amount of ingredients is deposited on the base plate. A synchronized motion of X, Y and Z axis creates the exact shape, size and nutritional characteristics of the pizza thus providing a customized experience to the consumer. The synchronized motion is governed by the GCODE.

The 3D food printer 106a has cartridges for multiple crusts, for instance gluten-free, whole-wheat, regular dough, multiple sauces like marinara and pesto, multiple cheese and so on. Consequently, a pizza is created using the ingredients selected by the user in the mobile application.

The microcontroller receives the GCODE and subsequently decodes the GCODE into exact X, Y and Z location and activates each of the X, Y and Z stepper motor.

Figure 3A:
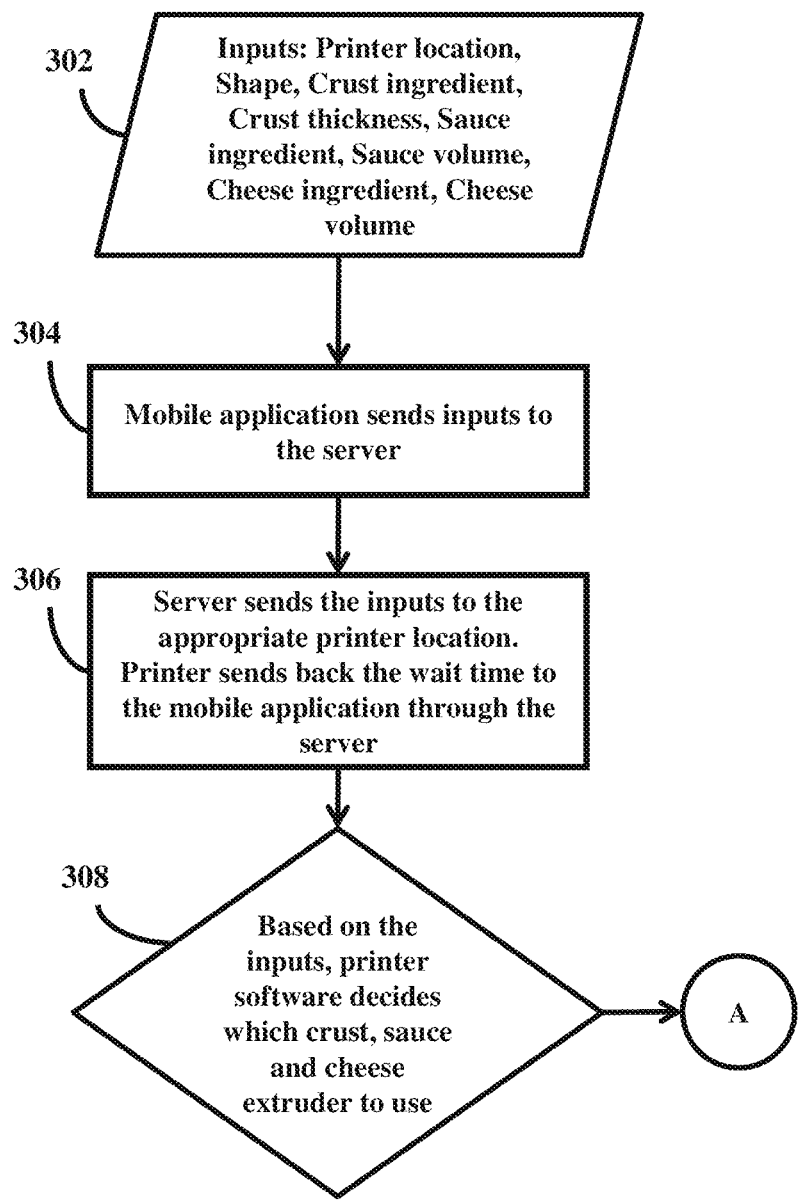
FIG. 3A-FIG. 3C is a flow diagram customizing pizzas on a mobile device and preparing on a pizza maker, according to the embodiments as disclosed herein.
Figure 3B:
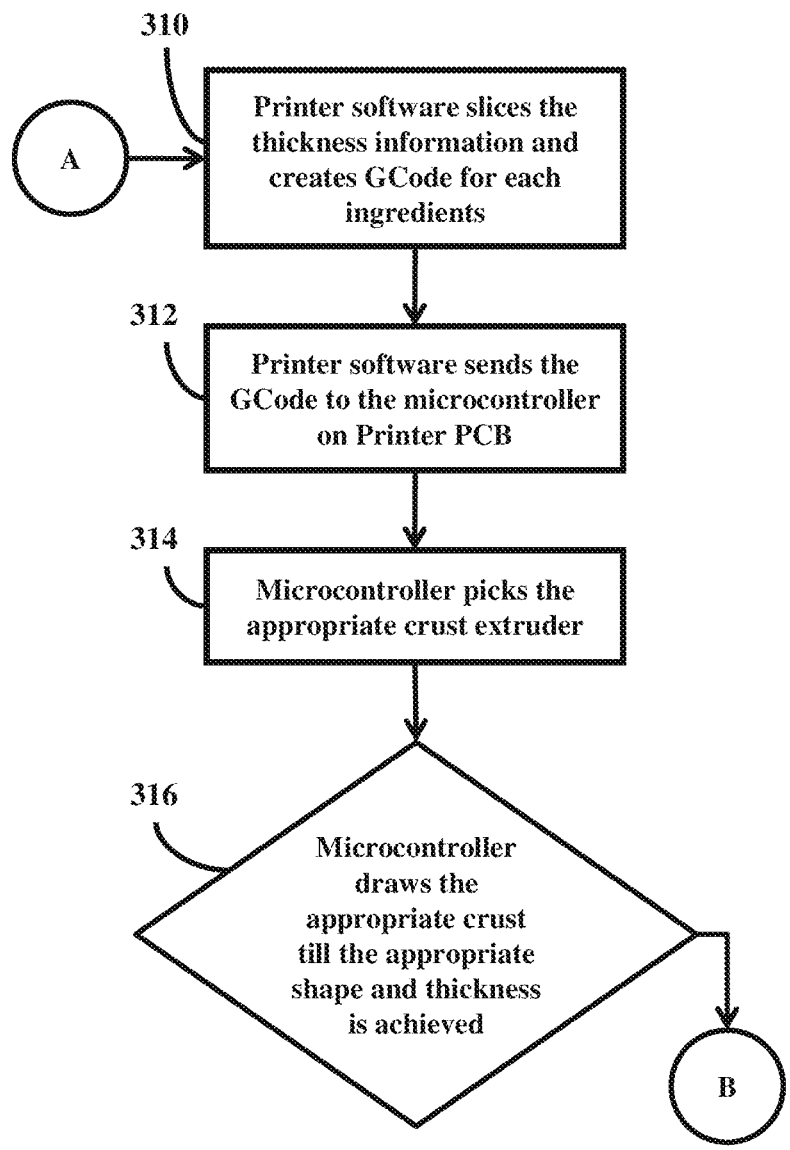
Figure 3C:
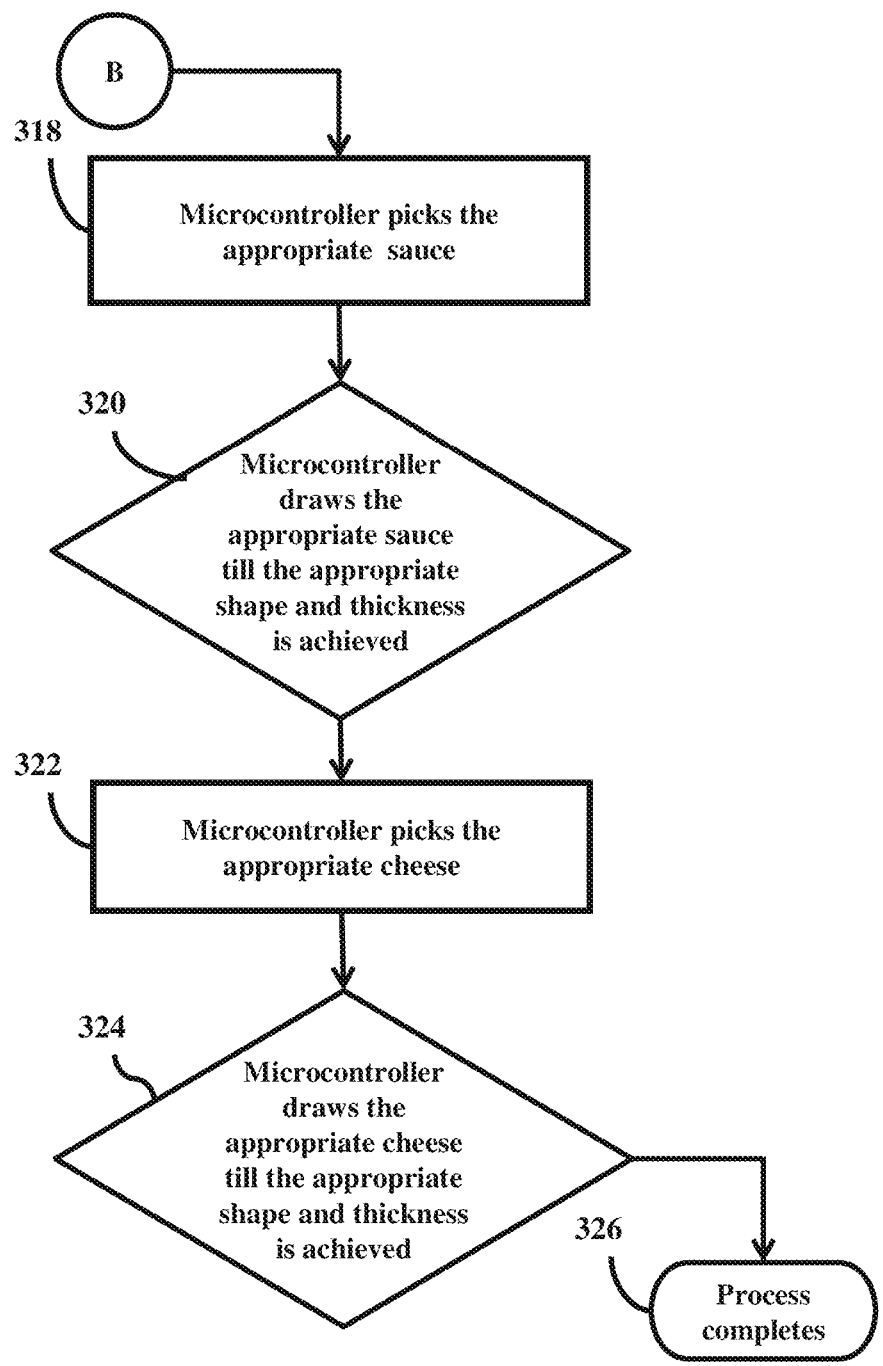

FIG. 3A-FIG. 3C is a flow diagram illustrating a method for customizing pizzas on a mobile device and preparing on a pizza maker, according to the embodiments as disclosed herein. The flow diagram begins at step 302.

At step 302, inputs are received from a user. The inputs include printer location, shape, crust ingredient, crust thickness, sauce ingredient, sauce volume, cheese ingredient and cheese volume.

At step 304, the mobile application configured on the user's computing device sends the inputs to the server.

At step 306, the server sends the inputs to the appropriate printer location. The 3D food printer sends back a wait time to the mobile application through the server.

At step 308, based on the inputs, the 3D printer software decides a crust, sauce and cheese extruder to use.

At step 310, the 3D printer software slices the thickness information and creates GCODE for each ingredient. The sliced 3D CAD Models are also called GCODES which are available on the server. The GCODES have specific file names, for instance "DoughUS1mmTHK300mmWIDE.GCODE".

Specifically, when a user selects a specific thickness and width of a pizza, a pointer is generated (for instance, US ###). This pointer is used as a key to find files on the server. After identification of various GCODES, an algorithm stacks up the GCODES together in a single file and sends it to a 3D Printer. The 3D Printer store will put this file in a queue and will then go to the printer when its available.

At step 312, the 3D printer software sends the GCODE to the microcontroller on the printer PCB.

At step 314, the microcontroller picks the appropriate crust extruder.

At step 316, the microcontroller draws the appropriate crust till the appropriate shape and thickness is achieved.

At step 318, the microcontroller picks the appropriate sauce.

At step 320, the microcontroller draws the appropriate sauce till the appropriate shape and thickness is achieved.

At step 322, the microcontroller picks the appropriate cheese.

At step 324, the microcontroller draws the appropriate cheese till the appropriate shape and thickness is achieved.

The method described herein can be used at several outlets as listed below:
1. The method can be used in Pizza restaurants to provide a much faster turnaround.
2. The method can be used in unmanned locations like cafeterias, airport lounges etc.
3. The method can be used to provide custom shapes like team mascots at sports stadiums and events.
4. The method can be used to provide custom character shapes at theme parks.

The method described herein is beneficial for several reasons as listed below:
1. Increases cost savings.
2. Consistent and efficient.
3. Provides customizable size, shape and nutritional content.

The flow diagram ends at step 326. The 3D printer software notifies the user.

Figure 4:
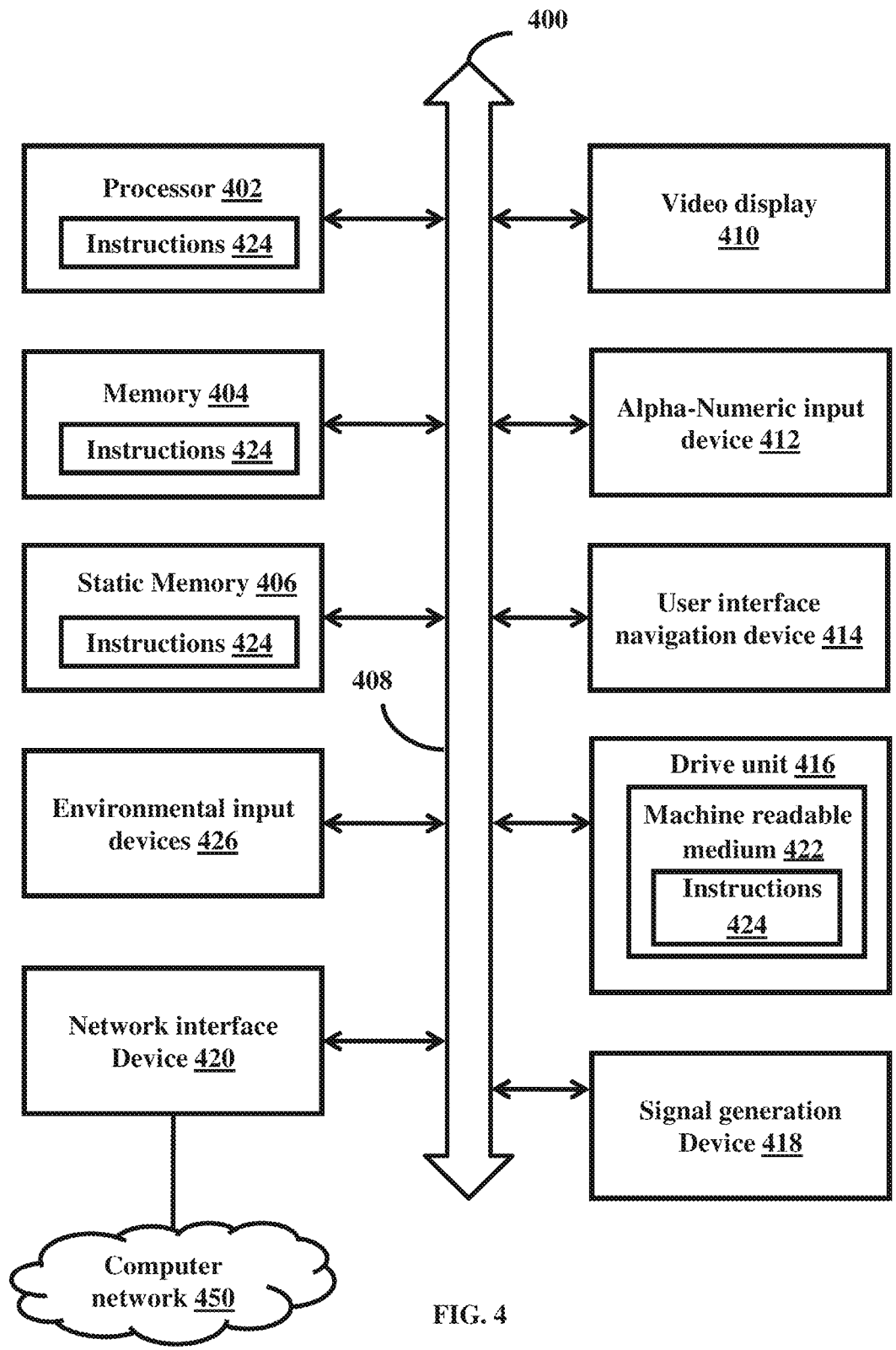
FIG. 4 is a block diagram of a machine in the example form of a computer system 400 within which instructions for causing the machine to perform any one or more of the methodologies discussed herein may be executed.

FIG. 4 is a block diagram of a machine in the example form of a computer system 400 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU), or both), a main memory 404, and a static memory 406, which communicate with each other via a bus 406. The computer system 406 may further include a video display unit (e.g., a liquid crystal displays (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker), and a network interface device 420. The computer system 400 may also include an environmental input device 426 that may provide a number of inputs describing the environment in which the computer system 400 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions 424 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 424 may further be transmitted or received over a computer network 450 using a transmission medium. The instructions 424 may be transmitted using the network interface device 420 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., Wi-Fi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 1802.11n). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof.

Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

System and Methodology of a Dynamic Print Bed

With respect to current 3D-printer technology, 3D-printer print beds are flat surfaces and require external material supports in order to print complex objects (e.g., objects having unstable weight distribution and/or one or more overhangs). A 3D-printer system having a dynamic print bed may reduce the need for the use of external material supports in order to print complex objects. Specifically, a dynamic print bed, comprised of a plurality of adjustable pins, supports the distribution of weight of the object as the object is being printed and/or cured. Additionally, a dynamic print bed may be used in conjunction with external material supports during the printing process.

Referring to FIG. 5A, an exemplary illustration of a print system 500 is shown. The print system 500 includes a 3D-printer system 502 having a housing 504, a CNC robot 506 (also referred to herein as a "topping robot") having a plurality of food silos ("food silos") 508 for storing edible toppings, an electronic device 510 communicatively coupled to the 3D-printer system 502 and the CNC robot 506 and providing a display screen that may be used to receive input via a user interface. The print system 500 also includes a cart 512 that may include a plurality of wheels to facilitate movement of the print system 500. The cart 512 is also configured to support the 3D-printer system 502, the CNC robot 506 and the electronic device 510. Further, the interior of the cart 512 may be temperature-controlled and stored one or more food cartridges 514 ("food cartridges"). The interior of the cart 512 may also house an air compressor 516 (e.g., approved by the FDA) as well as a water and food residue receptacle 518 ("receptacle") that receives water and food residue resulting from an auto-cleaning process of the print system 500, which is discussed below in detail. Although not illustrated in FIG. 5A, the cart 512 may also house a coupling to a clean water source and as containers for storing cleaning solution. Additionally, the cart 512 may be configured to support a cleaning compartment (e.g., contains a housing that at least partially encloses an interior in which an auto-clean process is performed by the print system 500). The cleaning compartment is shown in, for example, FIG. 10. Further, a conveyor belt 520 may be configured to transport an object between the 3D-printer system 502 and the CNC robot 506.

Figure 5B:
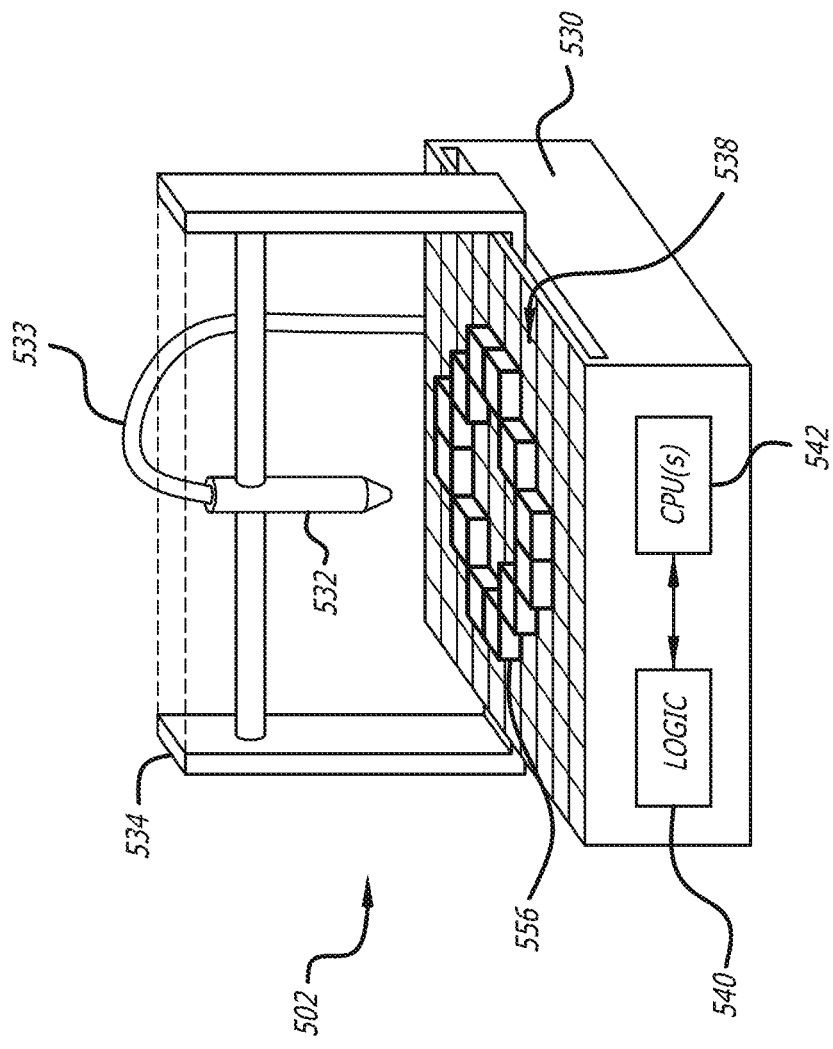
FIG. 5B is an exemplary illustration of a 3D-printer of the 3D-printer system, the 3D-printer having a dynamic print bed.

As will be discussed in more detail below, in one embodiment, the food cartridges 514 will be coupled to one or more extruders of the 3D-printer system 502 via piping 533, as seen in FIG. 5B. Upon receiving input corresponding to the printing of an object, the logic (e.g., of the stored electronic or stored elsewhere within the print system 500, for example in the 3D-printer system 502 as discussed in FIG. 5B) is executed, which results in the pumping of material from the food cartridges 514 through the piping 533 and out through the one or more extruders of the 3D-printer system according to the input. The object may then be transported from the 3D-printer system 502 to the CNC robot 506 for the printing of additional material stored in the food silos 508 via the conveyor belt 520. The CNC robot 506 may dispense one or more materials on an exterior of the object. Optionally, the object may be returned to the 3D-printer system 502 and a second phase of printing may commence.

In one embodiment, two different types of cartridges (e.g., cartridges to store edible material, herein after referred to as "food cartridges"), both generally represented by reference number 514. A first type of food cartridge may be configured to store viscous ingredients, wherein the first food cartridge has a cylindrical-shape. Such a food cartridge may be comprised of stainless steel and may contain a FDA-approved Teflon™ piston. Additionally, such a food cartridge may be stored in a temperature-controlled compartment, e.g., compartment or chart 512. A second type of food cartridge may be configured for storing powder and granular types of foods or micro-nutrients (e.g., iron, calcium, vitamins, zinc, magnesium, thiamine, riboflavin and/or natural or artificial flavors). These cartridges may include couple with flexible auger(s) when connected within computer numerical control (CNC) robot. These cartridges may also be enclosed within a temperature-controlled compartment within compartment 512.

In one non-limiting example of a printing process, the operations of which may be performed by the print system 500 of FIG. 5A, may include a base layer of macro-nutrients, e.g., in a paste form, is dispensed, e.g., as a foundation of an edible object, via one or more extruders. Following the printing of the base layer, e.g., a first portion, the base layer will be transported under a CNC robot via a conveyor belt (e.g., the base layer may have been printed thereon). Subsequently, the CNC robot will deposit micro-nutrients on an exterior of the base layer, creating a second portion of the edible object comprising the base layer and the micro-nutrients layer. The second portion of the edible object may then be transported back under the extruders and a third layer may be printed on top of the second portion of the edible object, creating a third portion. In one embodiment, the third layer may be the same type of macro-nutrient paste comprising the first portion. A second embodiment may in the third portion comprising a different type of macro-nutrient paste comprising the first portion. As an optional step, the conveyor belt may transport the third portion under a curing mechanism (e.g., an IR heater), which will bake the edible object, such as a nutrition bar.

In one embodiment, a 3D-printer system is configured to print edible objects and includes a dynamic print bed 538, as shown in FIG. 5B and discussed below. A dynamic print bed may be configured to change shape based on, one or more, at least of, user input and/or GCODE/MCODE inputs. Such a 3D-printer system with a dynamic print bed provides several benefits including changing a mold shape without adding an external support structure and/or removing a portion of the print bed.

Referring to FIG. 5B, an exemplary illustration of the 3D-printer system 502 of the print system 500, the 3D-printer system 502 having a dynamic print bed is shown. As illustrated in FIG. 5B, a 3D-printer system 502 includes a 3D-printer base 530, one or more extruders 532 (wherein a single extruder is shown for purposes of clarity) coupled to piping 533 through material to be printed travels, a 3D-printer housing 534, a plurality of dynamic pins 536 that form a dynamic print bed 538, logic 540 stored on a non-transitory computer-readable medium and one or more CPUs 542. Although not shown, the 3D-printer base 530 may house a plurality of electromagnetic and/or pneumatic actuators in order to control the extension and/or retraction of the plurality of dynamic pins 536.

In one embodiment, the dynamic print bed 538 includes a plurality of dynamic pins 536 that are adjustable based on input. The plurality of dynamic pins 536 may be adjustable in a direction perpendicular to a base of the dynamic print bed 538. For example, the plurality of dynamic pins may be adjusted via electromagnetic or pneumatic actuation. In one embodiment, input may be received from a user, e.g., via a wired or wireless input mechanism such as a mobile device that transmits data to the 3D-printer system 502. The data may include dimensions of an object to be printed by the 3D-printer system 502 as well as ingredients to be used. Alternatively, the logic 540 of the 3D-printer system 502 may include functionality to retrieve predefined dimensions of a selected item to be printed stored in a storage device (not shown). The storage device may be housed within the 3D-printer system 502 (e.g., proximal to the logic 540) or may be remote from the 3D-printer system 502 (e.g., communicatively coupled to the print system 500 via a wired connection or a wireless connection, e.g., to a cloud storage system).

In one embodiment, upon receiving or retrieving the dimensions and ingredients of the object to be printed, the logic 540 activates one or more electromagnetic and/or pneumatic actuators ("actuators"), not shown, located beneath the dynamic print bed 538 such that the actuators cause a first subset of the plurality of the dynamic pins 536 to raise to at least a first height above the dynamic print bed 538. Additionally, one or more dynamics pins of the first subset of the dynamic pins 542 may be raised to a second height above the dynamic print bed 538. More generally, the logic 540 activates the actuators to cause the dynamic pins 542 of the dynamic print bed 538 to raise in such a manner to support material that will be printed in forming the selected object.

In one embodiment, the print system 500 including the dynamic print bed 538 may be used with less viscous material. Herein, the term "viscosity" generally refers to the thickness of material. Less viscous material flows easily while highly viscous material is thicker and does not flow as easily. For example, materials with viscosity levels as low as 1 centipoise (water) to as high as 100,000,000 centipoises (window putty or dough) may be used in the print system 500. By adjusting at least a subset of the plurality of dynamic pins, the dynamic print bed may be used to create a 3D-printed edible object having a predetermined shape. In a first illustrative example, a subset of the plurality of dynamic pins 536 may be adjusted prior to printing of an edible object such that the plurality of dynamic pins 536 forms a mold of a predetermined shape. The edible object may be printed and cured while the plurality of dynamic pins 536 remain in the adjusted position. Further, the plurality of dynamic pins 536 may subsequently be adjusted to a second adjusted position and a second portion of the edible object printed such that the second portion of the edible object has a second shape different from a first shape of the first portion.

Figure 16:
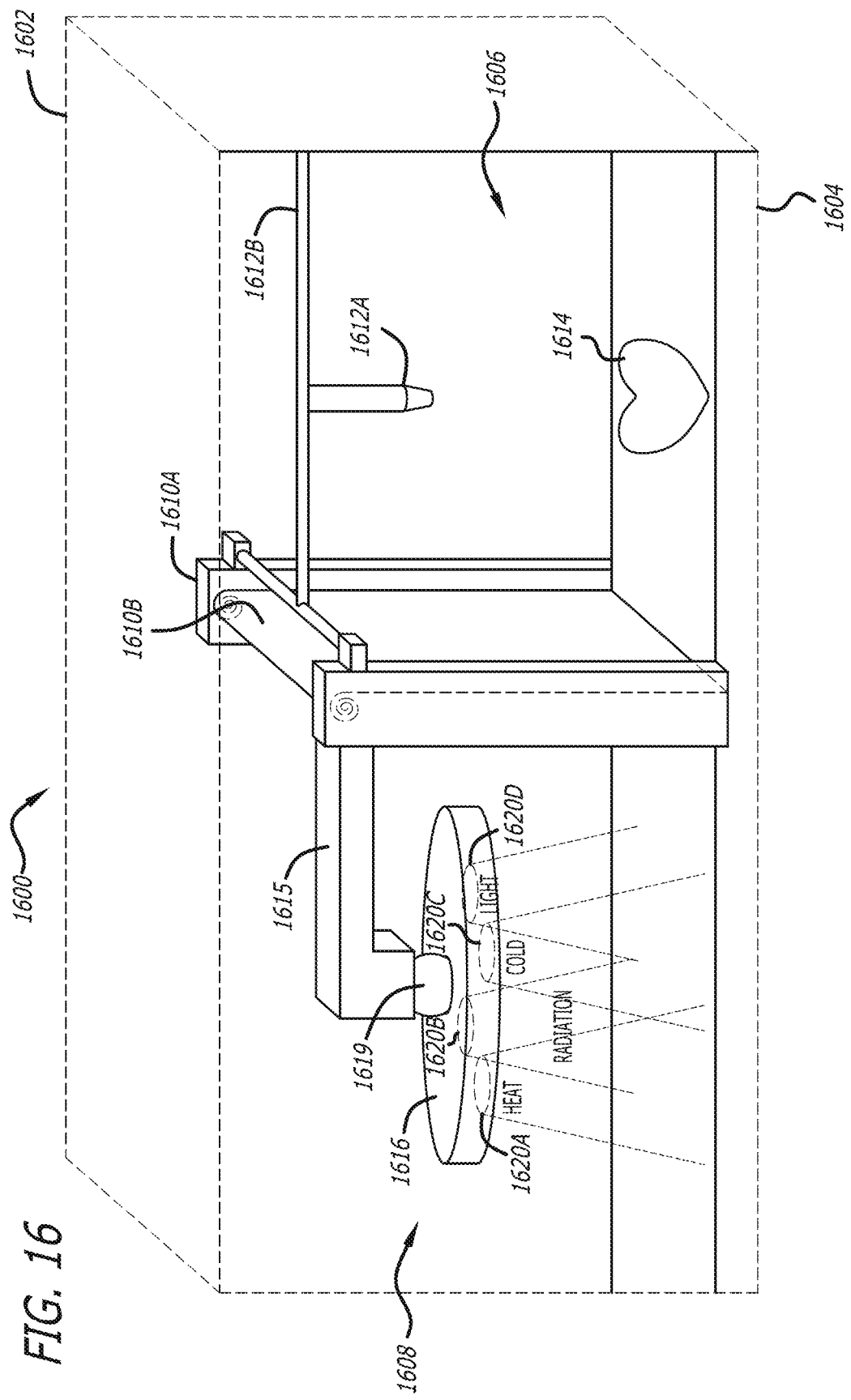
FIG. 16 is an exemplary illustration of a 3D-printer system having a curing compartment integrated therein.

Furthering the first illustrative example, the 3D-printing of the edible object may include a viscous material (e.g., dough, chocolate, frosting, sauce, cheese, or other purees). The 3D-printed viscous material may be cured to retain its shape while at least the subset of the plurality of dynamic pins 536 maintain their adjusted positioning in order for the 3D-printed viscous material to cure (e.g., without or without a curing agent, as discussed below). In such a scenario, following the curing of the 3D-printed viscous material, the subset of the plurality of dynamic pins 536 may retract (or adjust to a second positioning). An exemplary curing process as may be used with the print system 500 including the dynamic print bed 538 is illustrated in FIGS. 16-17.

In one embodiment, the dynamic print bed 538 is comprised of a first plurality of dynamic pins, wherein a pin may take any shape, e.g., a circular tube, a rectangular column, and/or any other shape. In a second embodiment, the dynamic print bed 538 is comprised of a second plurality of dynamic pins, the second plurality greater than the first plurality such that the dynamic print bed comprised of the second plurality of dynamic pins allows for greater granularity in creating a shape of an edible object as compared to the dynamic print bed comprised of the first plurality of dynamic pins.

In one embodiment, the 3D-printer system 502 may include one or more sensors, e.g., coupled to the one or more extruders and/or to the gantry to which the extruders are coupled. The one or more sensors may detect measurements of an object in the dynamic print bed 538 (e.g., either printed or placed thereon), determine dimensions of the object and, based on the determined dimensions of the object, raise one or more pins in order to support the object and/or to support a portion of the object that is to be printed. For example, a cupcake may be placed on the dynamic print bed 538 (or printed thereon) and the one or more sensors may detect measurements of the cupcake so that logic of the 3D-printer system 502 may determine the dimensions of the cupcakes. Upon determining the dimensions of the cupcake, one or more pins may be extended upward surrounding the cupcake in order to support an additional layer that will hang off of the original cupcake. Furthermore, as will be discussed below, the object may be then transported to a curing compartment (e.g., while on the dynamic print bed with the one or more pins extended) to cure additional layer.

Referring now to FIG. 6, an exemplary flowchart of a method of printing an object utilizing a 3D-printer system having a dynamic print bed is shown. Each block illustrated in FIG. 6 represents an operation performed in the method 600 of performing a printing operation using the print system 500 having the dynamic print bed 538 as seen in FIG. 5B. At block 602, logic of the 3D-printer system receives measurements corresponding to dimensions of an object. Responsive to receiving the measurements, the logic activates one or more actuators which are configured to adjust the dynamic print bed based on the dimensions of the object to be printed (block 604). Specifically, the adjustment of the dynamic print bed includes adjusting a positioning of a first set of one or more dynamic pins that comprise the dynamic print bed.

At block 606, one or more extruders of the 3D-printer system print a first portion of the object (e.g., by extruding a first material) such that the first set of one or more dynamic pins of the dynamic print bed supports the first portion of the object.

As an optional additional operation, the logic may activate one or more actuators to a positioning of a second set of one or more dynamic pins comprising the dynamic print bed (block 609). In one embodiment, the second set of one or more dynamic pins may be different from the first set of one or more dynamic pins. In a second embodiment, the second set of one or more dynamic pins may be the same as the first set. As another optional operation, the one or more extruders of the 3D-printer system may print a second portion of the object (e.g., by extruding a first or second material) such that the second set of one or more dynamic pins of the dynamic print bed supports at least the second portion of the object (block 610).

In an alternative embodiment, the 3D-printer system may include one or more robotic mechanisms (e.g., a robotic arm) that aids in supporting the object as it is being printed in place of, or as a supplement to, the pins of the dynamic print bed. As discussed above with the pins of the dynamic print bed, the one or more robotic mechanisms may move via electromagnetic and/or pneumatic actuation.

System and Methodology of Detecting an Object and Printing on Exterior of Object Often, edible objects (e.g., cakes or cookies) are placed on a 3D-printer print bed in order to have additional edible material printed on the exterior of the object. An object may be placed on any part within the print bed (e.g., and/or printed on any part of the print bed). In one embodiment, one or more sensors may be placed within, or coupled to, the 3D-printer housing. The one or more sensors may be communicatively coupled to one or more software modules ("software modules"), which are configured to receive input from the one or more sensors and detect a location of an edible object. Additionally, the one or more software modules may be configured to determine the dimensions of the object (e.g., a shape, size, profile (e.g., one or more surface contours corresponding to the exterior of the object) and/or a depth of the object). In particular, the dimensions of the object may be detected in accordance with user input that specifies a resolution, as will be discussed below. Furthermore, the one or more sensors may be configured to measure a weight and/or temperature of the object (e.g., external and/or internal temperature). For example, the weight may be measured via a scale incorporated into the print bed. In one embodiment, the software modules may determine a food type of the object based on measured characteristics including dimensions, weight, color and/or temperature. In such an embodiment, the software modules may perform one or more correlations between the measured characteristics and measured characteristics of known food types (e.g., stored in non-transitory computer-readable medium either incorporated in the 3D-printer system or communicatively coupled to the 3D-printer system).

Figure 7:
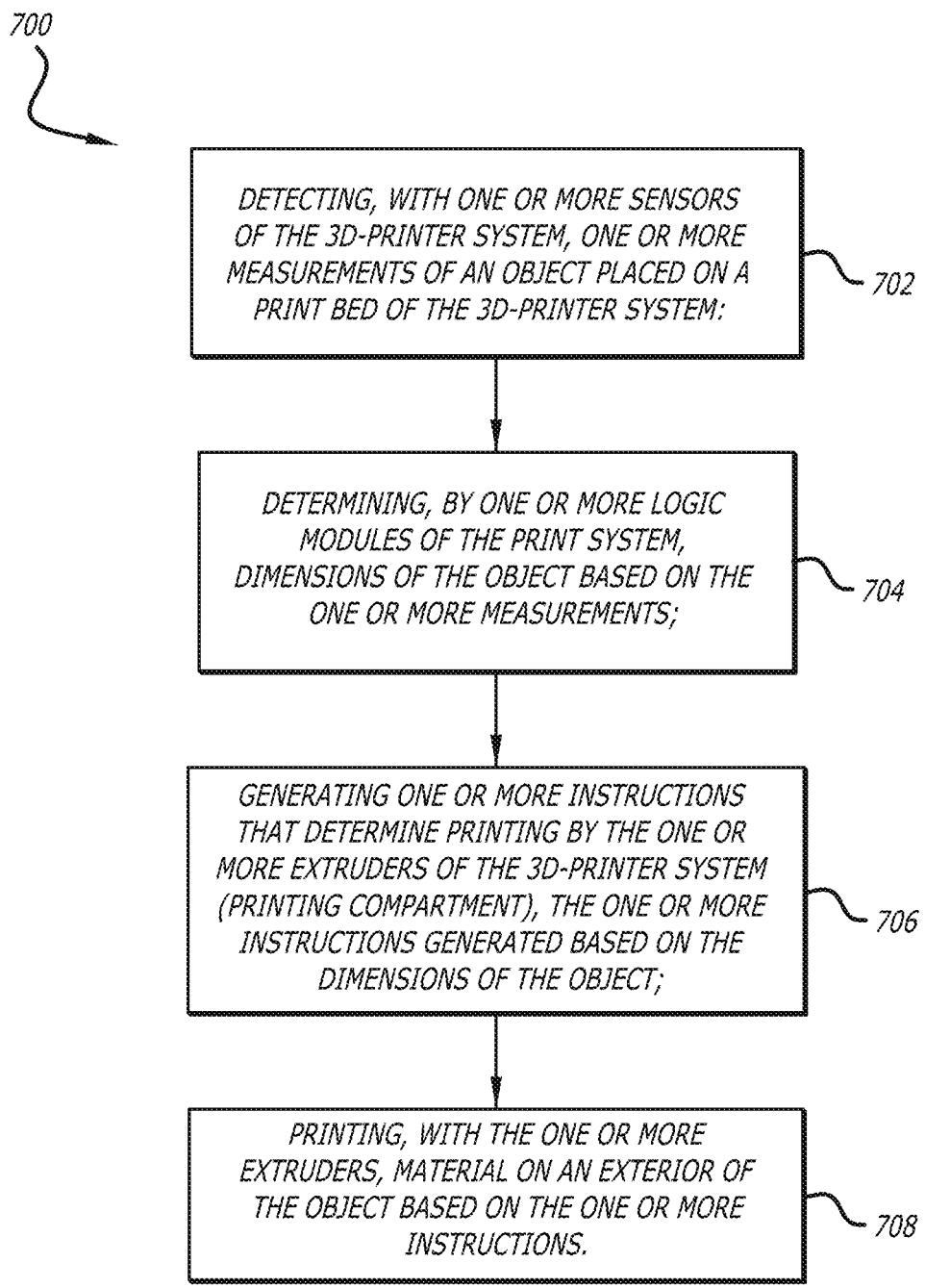
FIG. 7 is an exemplary flowchart of a method of detecting dimensions of an object placed on a print bed and printing on an exterior of the object according to the detected dimensions.

Referring now to FIG. 7, an exemplary flowchart of a method of detecting dimensions of an object placed on a print bed and printing on an exterior of the object according to the detected dimensions and location is shown. Each block illustrated in FIG. 7 represents an operation performed in the method 700 of detecting an object on a print bed using one or more sensors. At block 702, one or more sensors of a 3D-printer system detect measurements of an object placed on a print bed of the 3D-printer system. In one embodiment, the print bed may include a single surface. In a second, embodiment, the print bed include a plurality of dynamic pins as illustrated above in FIG. 5B. At block 704, one or more logic modules ("logic") of the 3D-printer system determines one or more dimensions ("dimensions") of the object based on the one or more measurements as well as a location of the object on the print bed. Herein, the term dimensions may generally refer to a measurable spatial characteristic. Examples of measurable physical characteristics include, but are not limited or restricted to, length, breadth, depth, or height.

Subsequent to the determination of the one or more measurements of the object, the logic may generate one or more instructions (e.g., GCODES and/or MCODES) that determine the process of printing on an exterior of the object by one or more extruders of the 3D-printer system. Specifically, the one or more instructions are based on the dimensions of the object. Additionally, the logic may also receive additional, e.g., via user input, that may include a material/substance and/or shape to be printed on an exterior of the object. For example, in one embodiment, a shape, having a first size, to be printed on an exterior of the object may be provided such that the first size of the shape would not fit on the object. In such an embodiment, the logic of the 3D-printer system determines a second size for the shape to be printed such that the second size fits on the exterior of the object based on the detected measurements of the object. Additionally, the logic determines a location of the object on the print, e.g., relative to the center of the print bed, so that the extruders print in the appropriate location. In one embodiment, the size of the shape and location of the object, inter alia, is included within the one or more instructions.

Following generation of the one or more instructions, the execution of the one or more instructions by one or more processors of the 3D-printer system causes the one or more extruders to print one or more materials on the exterior of the object.

Figure 8B:
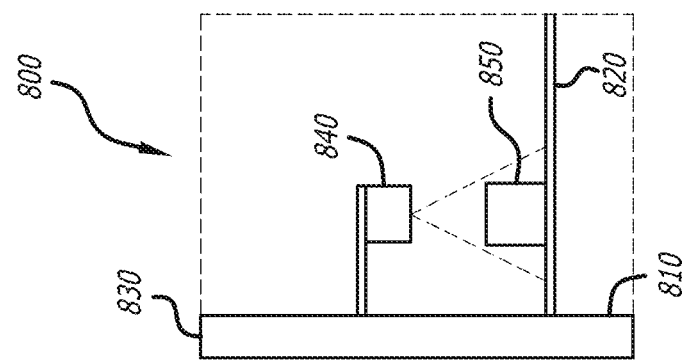
FIGS. 8A-8B are exemplary illustrations of a 3D-printer system having one or more sensors to detect the dimensions of an object placed on a print bed of the 3D-printer system.
Figure 8A:
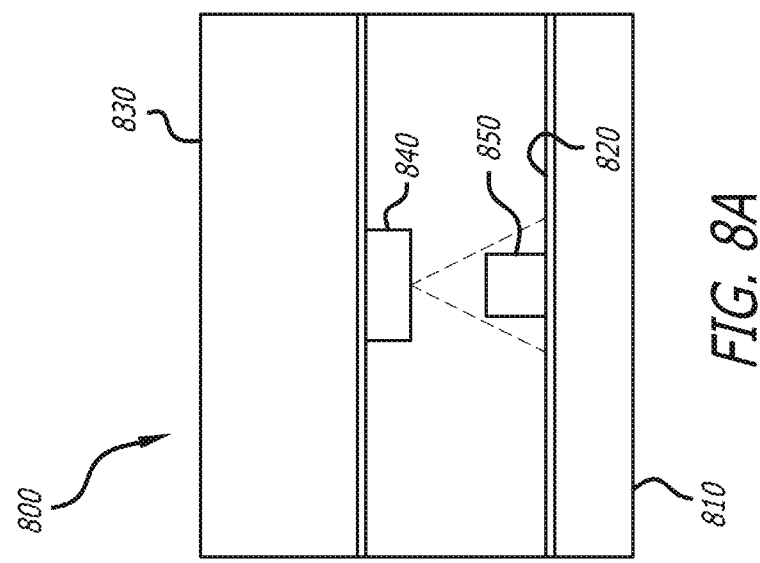

Referring now to FIGS. 8A-8B, exemplary illustrations of a 3D-printer system having one or more sensors to detect the dimensions of an object placed on a print bed of the 3D-printer system are shown. Referring to FIG. 8A, a front view of a 3D-printer system including one or more sensors for detecting an object placed on a print bed is shown. The 3D-printer system 800 includes a 3D-printer base 810, a print bed 820, a 3D-printer housing 830 and one or more sensors 840. An object 850 is illustrated on the print bed 820. In one embodiment, the one or more sensors 840 are coupled to one or more extruders (not shown for purposes of clarity). In one embodiment, the one or more sensors 840 detect physical attributes of an object by capturing two or three dimensional images of the object and comparing the object to pre-set expectations (e.g., expectations may be known, predetermined images) and/or the object's surroundings to determine the object's dimensions, color, and/or food or material type. The information gathered by the one or more sensors 840 is then used by the logic of the print system 500 to alter machine code (e.g., GCODES/MCODES) in order to print in accordance with, or in response to, the physical attributes of the object.

Referring to FIG. 8B, a side view of the 3D-printer system including one or more sensors of FIG. 8A for detecting an object placed on a print bed is shown.

Figure 8C:
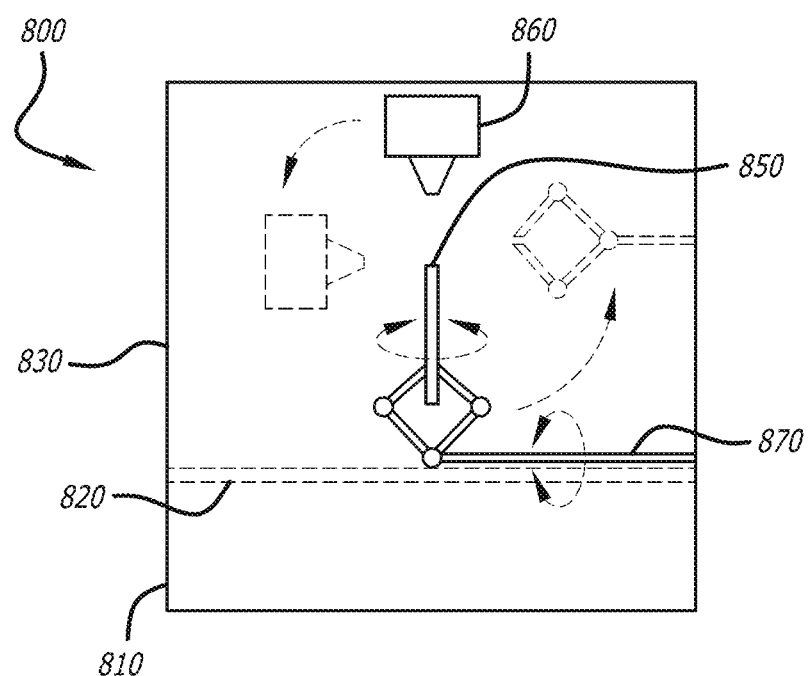
FIG. 8C is an exemplary illustration of a 3D-printer system having a robotic mechanism for gripping and adjusting a positioning of an object placed on a print bed of the 3D-printer system.

As current 3D-printer systems fail to determine the dimensions of objects placed on a print bed, such 3D-printer systems are limited in the scope of what they are able to print. For example, current 3D-printer systems merely print in a predefined space in a slice-by-slice manner where each slice includes a fixed height (e.g., a fixed Z value when utilizing a standard X, Y, Z coordinate system). In contrast, a 3D-printer system of the present disclosure includes one or more extruders each able to pivot and/or tilt in order to print while moving in any of the six degrees of freedom as discussed below. Referring to FIG. 8C, a side view of a 3D-printer system including a movable and adjustable extruder as well as an optional robotic arm mechanism for modifying the positioning of the object is shown. The 3D-printer system illustrated in FIG. 8C may include the components of the 3D-printer system of FIGS. 8A-8B and additionally may include a robotic arm mechanism 870. The extruder 860 illustrated in FIG. 8C may be movable in any of the six degrees of freedom (which are understanding as moving forward/backward on the X-axis, left/right on the Y-axis, up/down on the Z-axis, tilting side to side on the X-axis (roll), tilting forward/backward on the Y-axis (pitch) and turning left/right on the Z-axis (yaw)). As is seen in FIG. 8C, the extruder 860 may be movable from a first position (e.g., 12 o'clock) to a second position (e.g., 9 o'clock), which illustrates movement of the extruder in the X-axis, the Z axis as well as in a roll movement.

Furthermore, FIG. 8C also illustrates the 3D-printer system 800 including an optional robotic arm 870. The robotic arm 870 may be coupled to the housing 830 and may also move in any of the six degrees of freedom discussed. The robotic arm 870 may include a gripping or clamping mechanism that is configured to hold a portion of an object 850 (e.g., placed or printed on the print bed) and adjust a positioning of the object. The object 850 may be any object, e.g., an edible object, such that the object 850 includes at least a portion that is solid and may be gripped by the robotic arm 870. The logic of the 3D-printer system may execute predefined instructions that causes the actuation of one or more motors that control the movement of the robotic arm 870.

System and Methodology of Auto-Cleaning

Machines that process and/or handle food require a high-level of hygiene. Specifically, repeatable and reliable cleaning of the machine is of the utmost importance. 3D-printers that print edible food are no exception and require a way to automatically self-clean in order to eliminate any human errors and provide a consistent, reliable cleaning cycle. As briefly discussed above, the current process of cleaning a 3D-printer system is highly manual that includes cleaning the 3D-printer system with high pressure foaming and rinsing with hot water and steam. Additionally, a user directs the ejection of the foam and hot water towards the 3D-printer system to clean the area. Additionally, steam may be used to clean the 3D-printer system as well. Such methods of cleaning can be difficult and ineffective with a 3D-printer system as, during printing, food travels through internal pathways that are often inaccessible by such methods. Although discussed in detail below, in one embodiment, one method of auto-cleaning includes utilizing (i) active cleaning with hot water, and (ii) passive cleaning with light. The active cleaning with water may involve cleaning with hot water and a cleaning solution (e.g., a detergent and/or a bleach solution). The passive cleaning may involve disinfection by directing light energy at one or more components of the 3D-printer system. Generally, when the auto-clean process is initiated (e.g., by a user, by expiration of a timer, etc.), a ball valve changes a pathway that accesses the one or more extruders from the one or more food cartridges to hot water and a multi-step cleaning begins. The steps may include, but are not limited or restricted to: (i) the gantry being moved to a cleaning compartment such that the print nozzle is aligned with a sink of the cleaning compartment so that food residue and water may collect in the sink; (ii) injecting the piping with a cleaning solution (e.g., a detergent and water solution); (iii) cleaning with push-pull mechanism of the gantry to remove any food residue (e.g., forward and reverse flow of water and/or detergent, which may be facilitated via the supply of pressure and/or suction from the air compressor 516 of FIG. 5A); (iv) injecting clean water through the piping and out through the one or more extruders in order to rinse the cleaning solution from the piping and the one or more extruders; and (v) optionally, injecting the piping with forced air in order to dry the piping and the one or more extruders.

Figure 10:
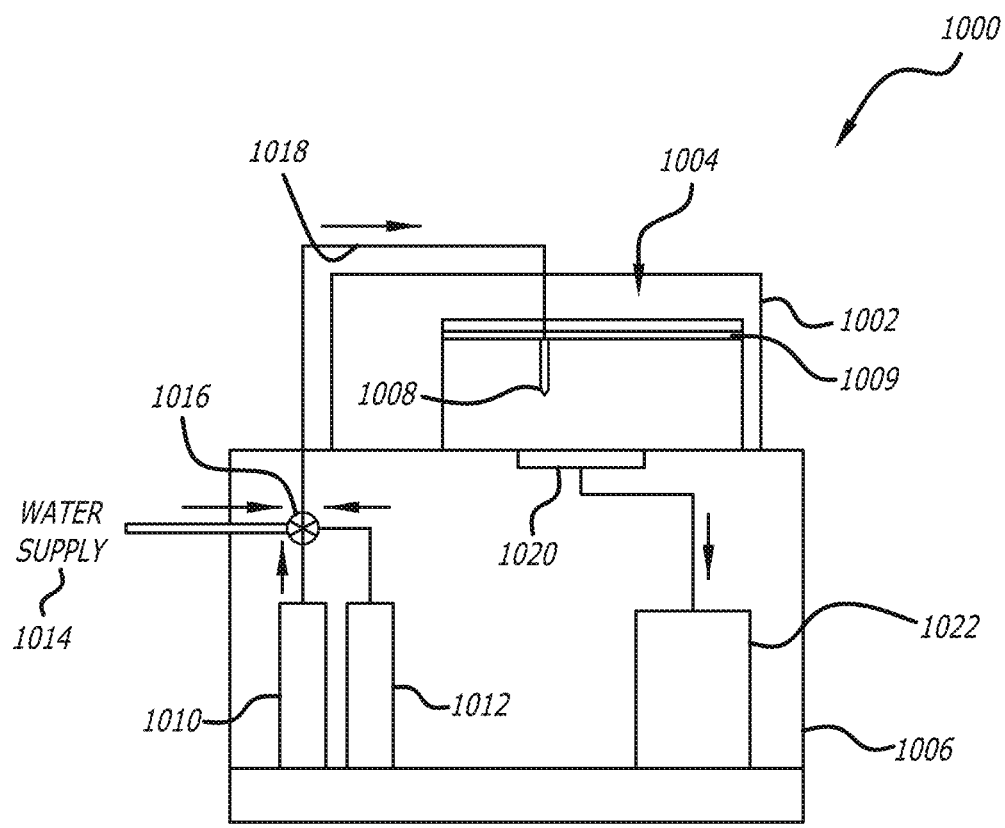
FIG. 10 is an exemplary illustration of a 3D-printer system having a cabinet configured to hold one or more food cartridges as well as a valve configured to accept at least a cleaning solution and water for cleaning a portion of the 3D-printer system using the auto-clean procedure as illustrated in FIG. 9.

Referring now to FIG. 9, an exemplary flowchart of a method of implementing an auto-clean procedure of a 3D-printer system is shown. As will be discussed with respect to FIG. 9, the 3D-printer system may include a plurality of compartments including, at least, a printing compartment and a cleaning compartment. Additionally, the 3D-printer system may include one or more extruders coupled to a gantry that supports and controls movement in a plurality of directions for the one or more extruders. Furthermore, the 3D-printer system may include a cart on which a housing (e.g., at least partially enclosing the cleaning compartment and/or the printing compartment), the cart housing one or more food cartridges that are coupled to the one or more extruders via piping. Specifically, each block illustrated in FIG. 9 represents an operation performed in the method 900 performed by cleaning components of a 3D-printer system. The cleaning components, as illustrated in FIG. 10, may be controlled by one or more microprocessors and/or microcontrollers (collectively referred to as "microprocessors") of the 3D-printer system that execute logic corresponding to instructions that determine specific movements of components of the 3D-printer system. Each of the operations disclosed herein may be determined and controlled by execution of logic by the microprocessors. At block 902, the gantry, including the one or more extruders, of the 3D-printer system is moved to a cleaning compartment. As one example, logic of the 3D-printer system may activate one or more motors and/or one or more actuators that cause the gantry to move, e.g., along rods, from the printing compartment to the cleaning compartment.

At block 904, a first cleaning phase is initiated that includes injecting water into a valve mechanism coupled to a first food cartridge stored in the cart of the 3D-printer system. The injected water is closed off from entering the first food cartridge by a cover that may automatically release when the first cleaning phase is initiated. Alternatively, the cover may be shifted manually by a user to prevent water from entering the first food cartridge. In yet another embodiment, the first food cartridge may be uncoupled from the valve mechanism and the uncoupling may automatically release the cover. The water may be injected with pressure to force the water through the valve mechanism, the piping and the extruder out through the extruder. Specifically, the injected water will push food residue from the valve mechanism, the piping out of the extruder. The water and food residue with collect in a sink of the cleaning compartment of the 3D-printer system. In one embodiment, the sink drains to a water and food residue receptacle ("receptacle"). In some embodiments, water may be injected for a predetermined amount of time during the first cleaning phase. In a second embodiment, a predetermined amount of water may be injected during the first cleaning phase.

At block 906, a second cleaning phase is initiated that includes injecting a cleaning solution into the valve mechanism. In particular, the cover of the valve mechanism as discussed with respect to the first cleaning phase remains in the same closed position so as to prevent the cleaning solution from entering the first food cartridge. Additionally, a valve mechanism may be configured such that only either water or cleaning solution (or optionally air) may enter the valve mechanism at once. Furthermore, the valve mechanism may include a coupler for each of the water and the cleaning solution (and optionally air) wherein the coupler is a check valve that only permits fluid flow in one direction. The cleaning solution is injected with a force similar to the water so that the cleaning solution is pushed through the valve mechanism, and piping out of the one or more extruders in order to drain into the sink.

At block 908, the first cleaning phase may be initiated for a second time in order to remove any cleaning solution left in the valve mechanism, the piping and/or the one or more extruders from the second cleaning phase. Additionally, at block 910, a third cleaning phase may be initiated that includes emitting radiation (e.g., ultraviolet radiation such as UVB and/or UVC radiation, e.g., at predetermined frequencies) towards the one or more extruders for a predetermined amount of time (e.g., and optionally at a predetermined wavelength). The radiation may be emitted through one or more bulbs located in the cleaning compartment or located in a radiation component such that the gantry is automatically moved to the radiation compartment prior to the emission of the radiation. In one non-limiting embodiment, light wavelengths having frequencies ranging from 100-400 nm are emitted and directed to one or more portions of the gantry, one or more extruders coupled thereto as well as piping coupled to the one or more extruders.

Referring now to FIG. 10, an exemplary illustration of a print system having a cabinet configured to hold one or more food cartridges as well as a valve configured to accept at least a cleaning solution and water for cleaning a portion of the print system using the auto-clean procedure as illustrated in FIG. 9 is shown. The print system 1000 includes a 3D-printer (e.g., a printing compartment), illustrated in, inter alia, FIG. 5A, a housing 1002 that at least partially encloses a cleaning compartment 1004 (e.g., an interior of the housing 1002), a cart or platform 1006 (referred to hereinafter as a "cart"), one or more extruders ("extruders") 1008, one or more food cartridges (e.g., a first food cartridge 1010 is shown, however, in some embodiments, multiple food cartridges may each have their own valve mechanism as discussed below), a cleaning solution source 1012, a water source 1014, a valve coupler 1016 and a piping 1018 to couple the valve coupler 1016 to the extruders 1018. In one embodiment, the valve coupler 1016 may include a plurality of coupling components wherein a separate coupling component couples the cleaning solution source 1012 and the water source 1014 to the valve coupler 1016. Additionally, each coupling component may be a one-way check valve. Further, the valve coupler 1016 may include a cover that, upon initiation of a cleaning cycle, is positioned to prevent cleaning solution or water from entering into the first food cartridge 1010. Additionally, although not shown, a pressurized air source (e.g., a FDA-approved air compressor 516 as illustrated in FIG. 5A) may be coupled to an additional coupling component of the valve mechanism 1016.

An auto-clean process occurring primarily within the cleaning compartment 1004 may be controlled by one or more microprocessors and/or microcontrollers (collectively referred to as "microprocessors") of the print system 1000 that execute logic corresponding to instructions that determine specific movements of components of the print system. Each of the operations disclosed herein may be determined and controlled by execution of logic by the microprocessors. A gantry 1009, which supports the extruders 1008, is moved from a printing compartment to the cleaning compartment 1004 (via one or motors that facilitate movement of the gantry and the extruders. As one example, logic of the print system may activate one or more motors and/or one or more actuators that cause the gantry to move, e.g., along rods, from the printing compartment to the cleaning compartment 1004.

During a first cleaning phase, as discussed in FIG. 9, clean water (e.g., via water supply 1014) is injected into the valve mechanism 1016 coupled to a first food cartridge 1010 stored in the cart 1006 of the 3D-printer system. The injected water is closed off from entering the first food cartridge 1010 by a cover that may automatically release, or be manually released, when the first cleaning phase is initiated in order to prevent water from entering the first food cartridge 1010. The water may be injected with pressure to force the water through the valve mechanism 1016, the piping 1018 and out through the extruders 1008. In such an embodiment, the air compressor 516 of FIG. 5A may cause the pressurized injection. Specifically, the injected water will push food residue from the valve mechanism 1016, the piping 1018 and the extruders 1008 out of the extruders 1008. The water and food residue with collect in a sink 1020. In one embodiment, the sink 1020 drains to a water and food residue receptacle 1022 ("receptacle").

Following the first cleaning phase, a second cleaning phase may be initiated that includes injecting, at pressure, a cleaning solution stored in the cleaning solution storage 1012 into the valve mechanism 1016. As with the injection of the water, the cover of the valve mechanism 1016 may remain in the same closed position so as to prevent the cleaning solution from entering the first food cartridge 1010. The cleaning solution is injected with a force similar to the water so that the cleaning solution is pushed through the valve mechanism, and piping and out of the one or more extruders in order to drain into the sink. Optionally, the first cleaning phase may be initiated for a second time in order to remove any cleaning solution left in the valve mechanism 1016, the piping 1018 and/or the extruders 1008 from the second cleaning phase.

Additionally, a third cleaning phase may be initiated that includes emitting radiation (e.g., ultraviolet radiation such as UVB and/or UVC radiation) towards the extruders 1008 for a predetermined amount of time (e.g., and optionally at a predetermined wavelength). The radiation may be emitted through one or more bulbs located in the cleaning compartment, not shown but either integrated into or coupled to the housing 1002. Alternatively, the bulbs may be located in a radiation component such that the gantry is automatically moved to the radiation compartment prior to the emission of the radiation (e.g., via the one or more motors/actuators). One advantage of directing radiation towards the piping 1018 and the extruders 1008 is that, along with cleaning the internal walls of the food piping, it is also equally important that the exterior surfaces of the food dispensers are cleaned and pathogen free. A radiation-based germicidal irradiation system (e.g., emission of UVC rays) can be deployed to clean the external surfaces where a pathogen buildup is likely.

System and Methodology of 3D Printing Based on Physiological Health Needs

A complete 3D-printer system capable of dispensing a variety of macro-nutrients and micro-nutrients (paste, powder and granular forms) that will include an integrated CNC robot and baking compartment. In one embodiment, such a 3D-printer system may include a simple software-based user interface (UI), one or more logic modules to interpret nutritional values based on physical activity (e.g., a rules-based analysis system), and a complete hardware system with (i) 3D-printer configured to print edible materials, e.g., in the form of edible paste deposition, (ii) a CNC robot for powder and/or granular micro-nutrient deposition, and/or (iii) an integrated curing mechanism, e.g., an infrared (IR) heating system for quick baking. In one embodiment, the 3D-printer system may collect physiological health data, e.g., of soldiers, via transmission of data collected using one or more wearable sensors. Such physiological data may include a soldier's unique marker (e.g., a unique numerical identifier). The collected data may be interpreted and formulated into nutritional values using the 3D-printer system's one or more logic modules. The determined nutritional values may be analyzed along with a predetermined prescribed diet for the individual as well as any predetermined dietary restrictions for the individual. The analysis, performed by the one or more logic modules, may include a rules-based determination of micro-nutrients and/or macro-nutrients required by the individual as well as one or more recipes (e.g., in the form of one or more GCODES/ MCODES) that will supply the individual with the necessary nutrients.

Additionally, in one embodiment, the one or more wearable sensors may be communicatively coupled to a network device (e.g., a smart phone, a tablet, a laptop, etc.) and transmit the detected physiological data to the network device. The network device may subsequently transmit physiological data to the 3D-printer system via a mobile application that may enable an individual to personalize food (e.g., select recipes for edible objects to be printed, wherein recipes presented to the individual may be only those that meet the individual's nutrient requirements, alternatively, all recipes may be presented). In embodiment, one or more selected recipes may be transmitted along with the physiological data to the 3D-printer system.

In one embodiment, FDA-grade pressurized air system, as shown by reference number 516 in FIG. 5A, connects to a relay bank, which is controlled by firmware embedded in a microcontroller of by the 3D-printer system (e.g., illustrated as reference number 542 in FIG. 5B. The relay bank guides pressurized air into a regulator, which activates a piston within a food cartridge, e.g., illustrated as reference number 514 in FIG. 5A. The piston, not shown, inside the food cartridge pushes viscous food ingredients through the extruder, e.g., illustrated as reference number 532 in FIG. 5B, which regulates food paste extrusion on the print bed. In one embodiment, the print bed may be heated to bake food while printing is in progress (e.g., via a heating element located within the print bed, for example, heating coils, or via a heat source within the printing compartment).

In yet another embodiment, ultrasonic/acoustic frequency applications and helical-shaped flexible auger systems may be considered and included within a 3D-printer system. For example, an ultrasonic horn may be coupled with a stainless steel tether inside of a food cartridge (e.g., storing a powder material). The 3D-printer system may dispense material at various frequencies, wherein the frequency may be dependent on the size of the particle diameter. In one non-limiting embodiment, a frequency of 40 KHz may be used in dispensing food with approximately a 0.1-0.2 mm particle diameter and a frequency of 10 KHz may be used in dispensing food having approximately a 1-4 mm particle diameter.

Figure 11:
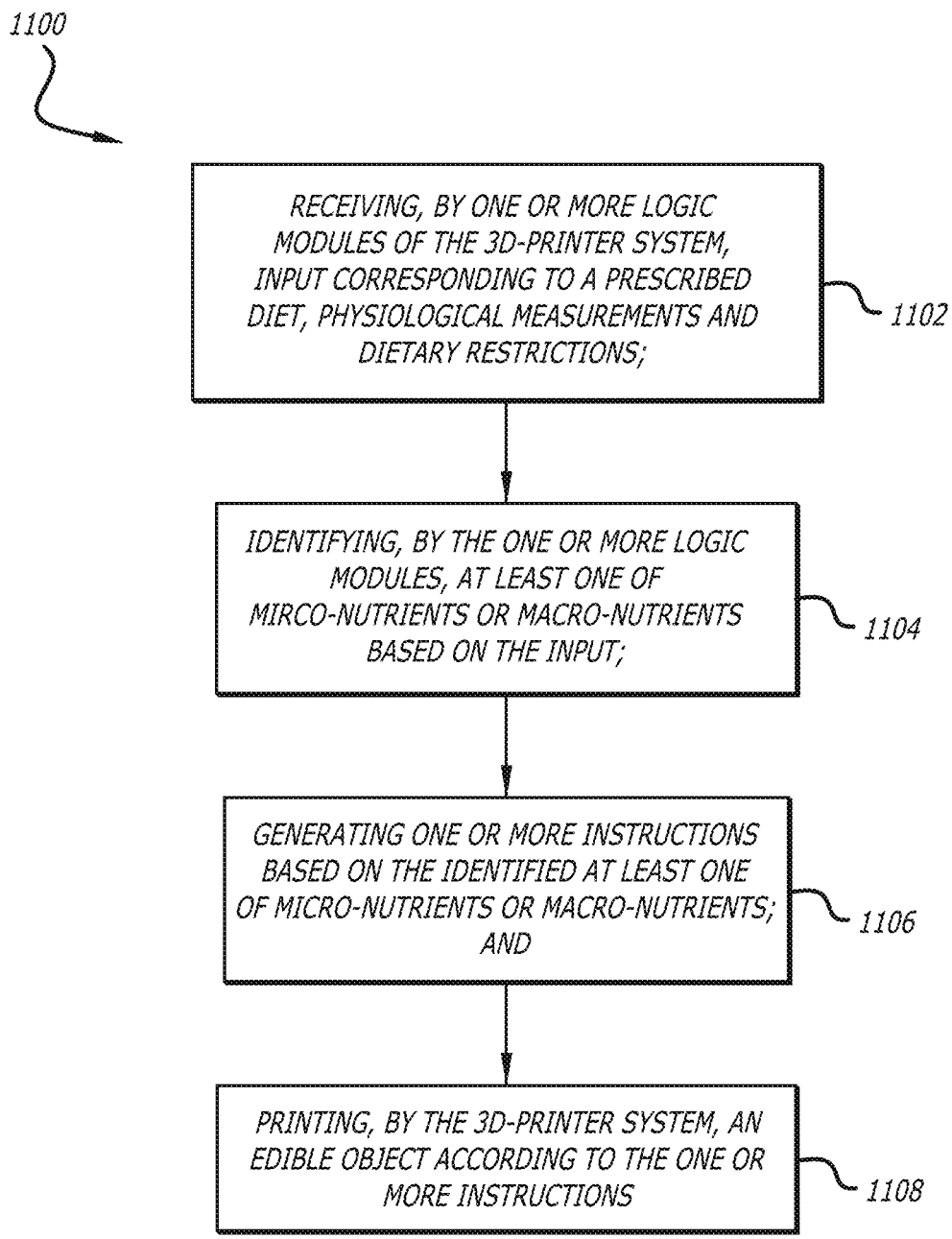
FIG. 11 is an exemplary flowchart of a method of printing an edible object with the 3D-printer system according to a plurality of inputs such that the edible object provides customized nutrients corresponding to at least physiological measurements.

Referring now to FIG. 11, an exemplary flowchart of a method of printing an edible object with a 3D-printer system according to a plurality of inputs such that the edible object provides customized nutrients corresponding to at least physiological measurements is shown. Each block illustrated in FIG. 11 represents an operation performed in the method 1100 of printing an edible object based on received health data. At block 1102, one or more logic modules ("logic") of a 3D-printer system receives input corresponding to one or more of, at least, a prescribed diet, one or more physiological measurements and/or dietary restrictions. The inputs may be received via a plurality of sources. For example, the one or more physiological measurements may be measured by one or more wearables worn by a consumer (e.g., human user) wherein the wearables may include a smart watch, a steps tracker, a heartrate—monitor, etc., such that the physiological measurements are received by the 3D-printer system via a wired or wireless coupling (e.g., universal serial bus (USB) connection, Bluetooth®, wirelessly from a cloud storage, etc.).

At block 1104, the logic identifies at least one of micronutrients and/or macro-nutrients required by the consumer based on the inputs prescribed diet, one or more physiological measurements and/or dietary restrictions. Additionally, the logic may identify one or more "recipes" for edible objects that fulfill the micro-nutrients and/or macro-nutrients required by the consumer (e.g., the recipes being a listing of ingredients to include in an edible printed object).

At block 1106, the logic generates one or more instructions (e.g., GCODES and/or MCODES) based on the identified micro-nutrients and/or macro-nutrients required by the consumer. The logic may include predetermined rules (e.g., which may include "if/then" scenarios) that relate to one's age, physical attributes, disorders, and/or lifestyle. For example, the input may include one's sleep pattern and heart rate during a time period leading up to interaction with the print system and the nutrients will be identified an analysis of one or more of the predetermined rules and the input (e.g., sleep pattern, heart rate). Additionally, one's age, physical attributes, disorders, and/or lifestyle may also be input or such input may be determined via one's unique identifier that would accompany any input.

Further, at block 1108, one or more processors of the 3D-printer system executes the one or more instructions, which cause one or more extruders of the 3D-printer system to print an edible object according to the one or more instructions.

Figure 12:
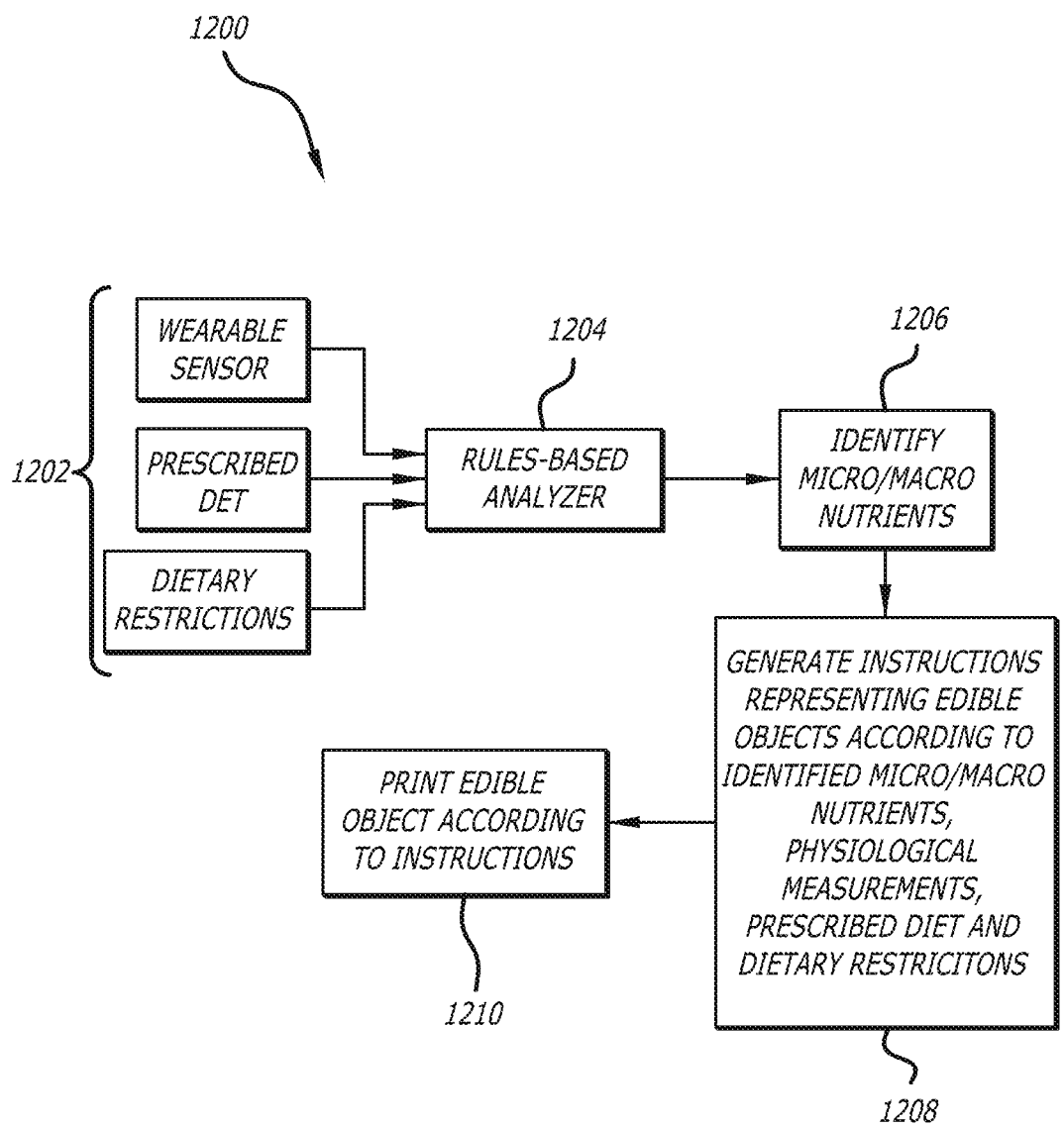
FIG. 12 is an exemplary block diagram illustrating the method of printing an edible object with the 3D-printer system as shown in FIG. 11.

Referring now to FIG. 12, an exemplary block diagram illustrating the method of printing an edible object with the 3D-printer system of FIG. 11 is shown. Each block illustrated in FIG. 12 represents an operation performed in the method 1200 of printing an edible object based on received input. At block 1202, input is provided into a computational algorithm stored on non-transitory computer-readable medium located in a 3D-printer system wherein the input may comprise, inter alia, physiological measurements from one or more wearable sensors of a consumer, a prescribed diet based on a health care professional's health assessment of a consumer (e.g., may include analysis of expected physical activity of the consumer) and dietary restrictions (e.g., a product of the consumer's environment and/or health restrictions such as allergies).

At block 1204, the computational algorithm processes the inputs and identifies micro-nutrients and/or macro-nutrients required by the consumer (block 1206).

At block 1208, the logic generates one or more instructions (e.g., GCODES and/or MCODES) that instruct the 3D-printer system how to print an edible object that satisfies the micro-nutrients and/or macro-nutrients required by the consumer according to the physiological measurements, prescribed diet and dietary restrictions of the consumer.

At block 1210, one or more processors of the 3D-printer system execute the one or more instructions which cause activation of and the extrusion of material by the one or more extruders of the 3D-printer system.

System and Methodology of a Robotic Topping Mechanism

Often, 3D-printed edible objects require ingredients dispensed in solid or powdered form. At times, such ingredients cannot be dispensed easily via an extruder system used in current 3D-printers. In one embodiment disclosed herein, a 3D-printer is provided that includes a robotic arm mechanism configured to place and/or dispense ingredients in the powdered and solid form on an exterior of an object. As one non-limiting example, ingredients dispensed in solid or powdered form may include pizza toppings, e.g., in the case when the 3D-printer is used to print pizzas. In a second non-limiting example, ingredients dispensed in solid or powdered form may include micro/macro nutrients when the 3D-printer is used to print edible objects according to personalized needs or wants. However, the disclosure is not intended to be limited to these applications.

Figure 13A:
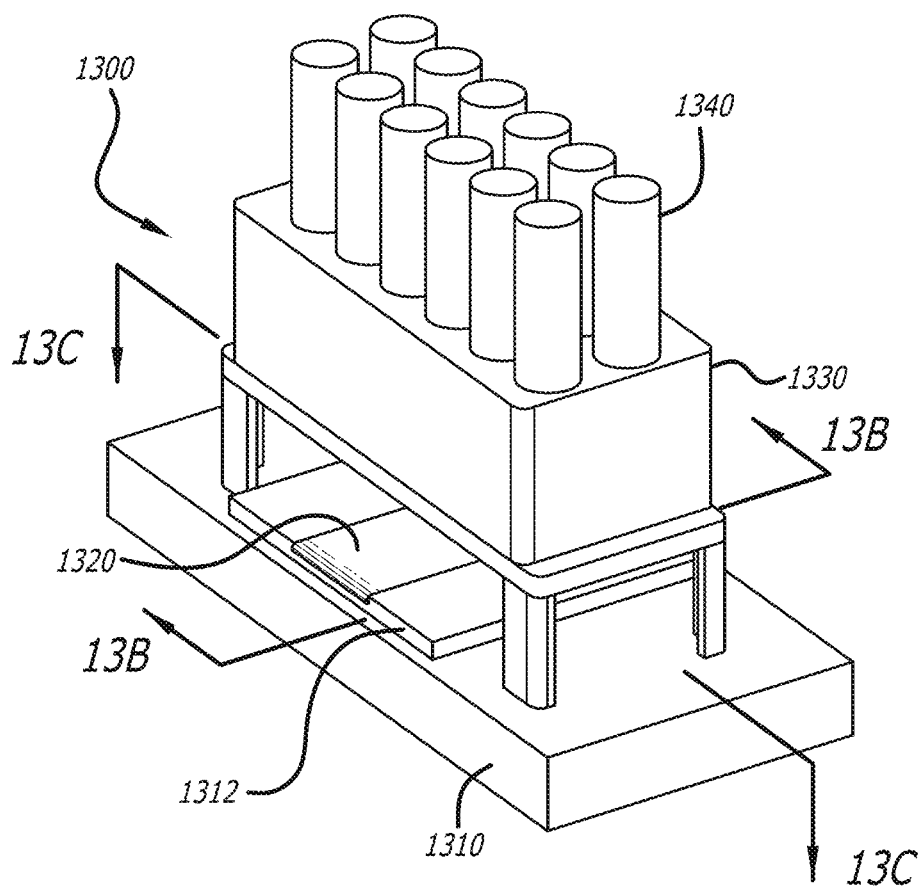
FIG. 13A is an exemplary illustration of a print system having a robotic topping mechanism.

Referring now to FIG. 13A, an illustrative embodiment of a topping robot (e.g., a CNC robot) of a print system, e.g., print system 500 of FIG. 5A, is shown. The topping robot 1300 is shown to include a first, stationary base 1310, a second, moveable base 1312 that includes a conveyor belt 1320, a housing 1330 and an auger-based system stored within the housing 1330 and shown in detail in FIGS. 14A-14B. Additionally the housing including a plurality of topping silos 1340 on a top portion. As an alternative embodiment, the food silos 1340 may be enclosed in a housing that is temperature-controlled in order to store the material within the food silos 1340 at a predetermined temperature. The conveyor belt 1320 may be aligned with a conveyor belt of a 3D-printer (e.g., 3D-printer 502 of FIG. 5A), and receive a printed object. The conveyor belt 1320 may be integrated with the moveable base 1312 so as to operate as a treadmill around the moveable base 1312 but not come in contact with the stationary base 1310. One or more pivotable pins 1314A-1314B ("pivotable pins"), illustrated in FIG. 13B, extend from the stationary base 1310 coupling the stationary base 1310 to the moveable base 1312. The pivotable pins more in relative synchronization so as to control movement of the moveable base 1312.

The movement controlled by the pivotable pins extending from the stationary base 1310 enables the object placed on the conveyor belt 1320 to be aligned with each of the nozzles that dispense the material stored in the food silos 1340. In one embodiment, the nozzles of the food silos 1340 may extend straight downward from the silos. In another embodiment, the nozzles may centrally located so as to require minimal movement of the moveable base 1312. In yet another embodiment, groupings of nozzles may be formed so that the moveable base 1312 moves only between a finite number of locations while still enabling material from each of the food silos 1340 to be dispensed on the object.

Figure 13B:
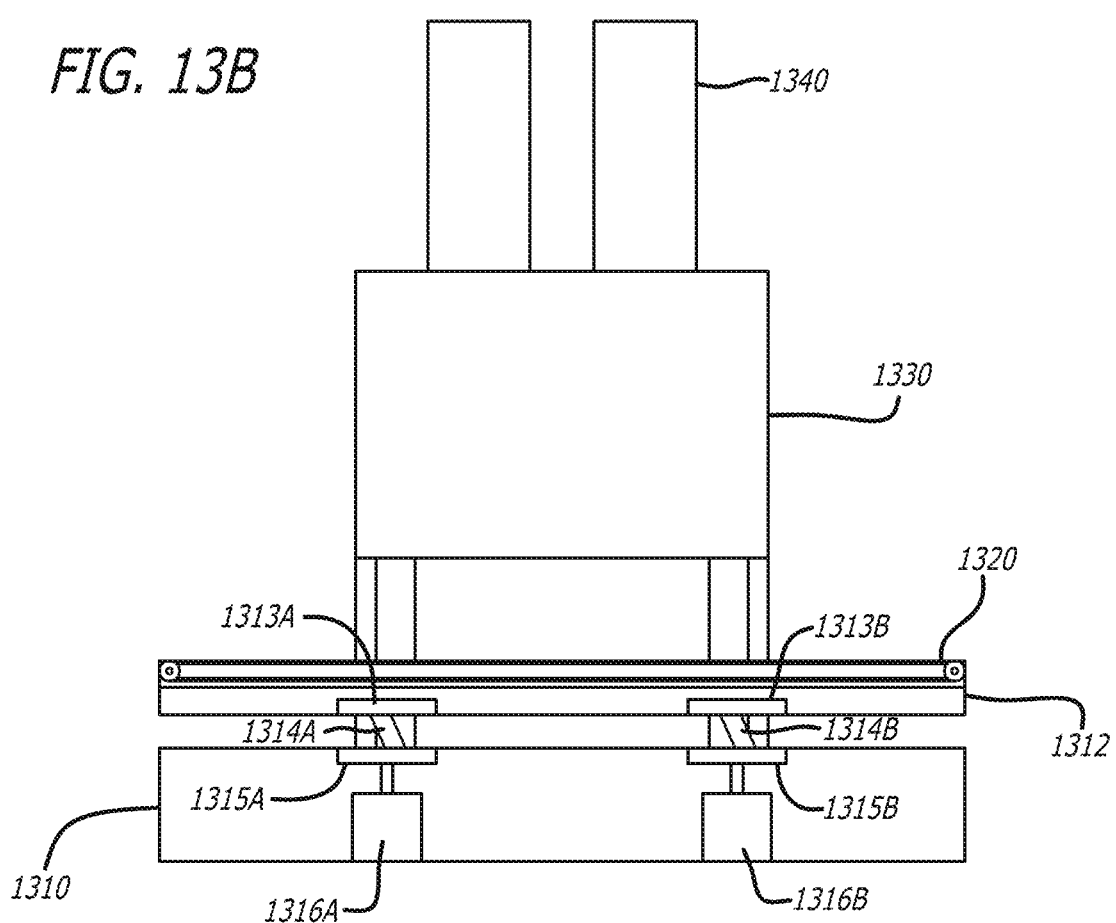
FIG. 13B is a cross-sectional view of the printer system of FIG. 13A.

Referring to FIG. 13B, a cross-sectional view of the printer system of FIG. 13A is shown. FIG. 13B illustrates that the stationary base 1310 may include components such as motors or actuators ("motors") 1316A-1316B that, when activated, move the pivotable pins 1314A-1314B. The pivotable pins 1314A-1314B may couple to the motors 1316A-1316B via coupler 1315A-1315B. Additionally, the pivotable pins 1314A-1314B couple to the moveable base 1312 via couplers 1313A-1313B.

Figure 13C:
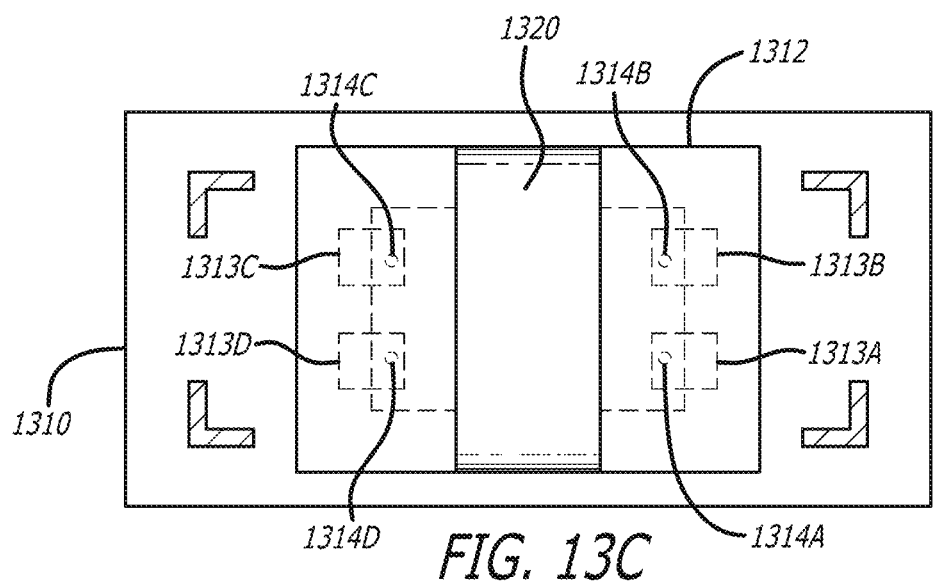
FIG. 13C is a top view of the printer system of FIG. 13A.

FIG. 13C is a top view of the printer system of FIG. 13A. FIG. 13C illustrates a four motors 1316A-1316D may be used to control movement of the moveable base 1312 through the pivotable pins 1314A-1314D. Although four motors are shown (e.g., one for each pivotable pin), fewer motors may be used.

Figure 14A:
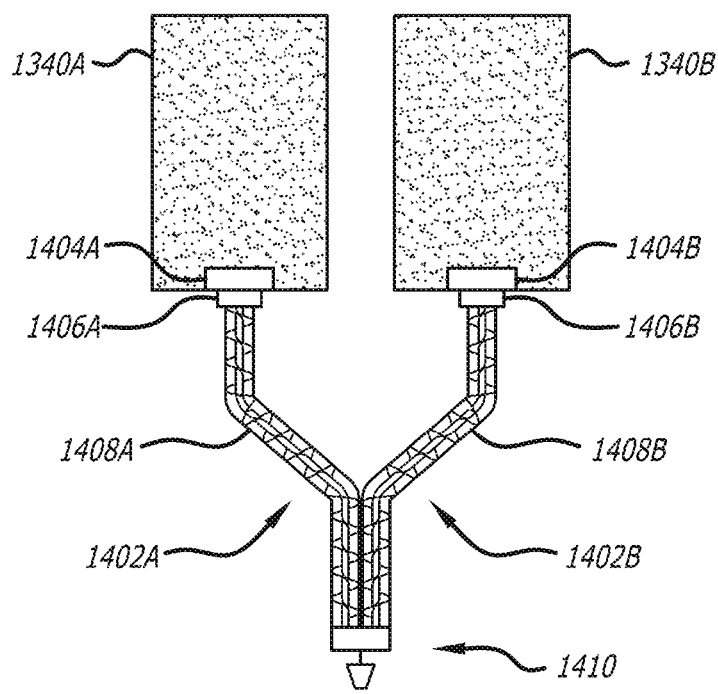
FIG. 14A is an exemplary illustration of a plurality of food cartridges coupled to a single nozzle via a piping including a flexible auger system.

Referring to FIG. 14A, an exemplary illustration of a plurality of food silos 1340A-1340B coupled to a single nozzle 1410 via piping including a flexible auger system is shown. In particular, the food silos 1340A-1340B may correspond to the food silos 1340 as illustrated in FIG. 13A. As the operations of dispensing via food silos 1340A-1340B are the same, the operations will be discussed with respect to food silo 1340B. A helical rotor 1404B and a motor 1406B are coupled to the food silo 1340B and the first auger-based dispensing unit (e.g., comprising a flexible auger 1408B within a flexible tubing 1402B coupling the food silo 1340B to a first nozzle 1410). Activation of the helical rotor 1404B and the motor 1406B, as a result of execution of logic by one or more processors of the print system, causes material within the first silo 1340B to be pulled into the tubing 1402B and extruded through the nozzle 1410. As discussed above with respect to FIG. 13A, an object on which material is to be dispensed will be aligned with the nozzle 1410 by way of movement of a moveable base 1312 on which the object will be located.

Figure 14B:
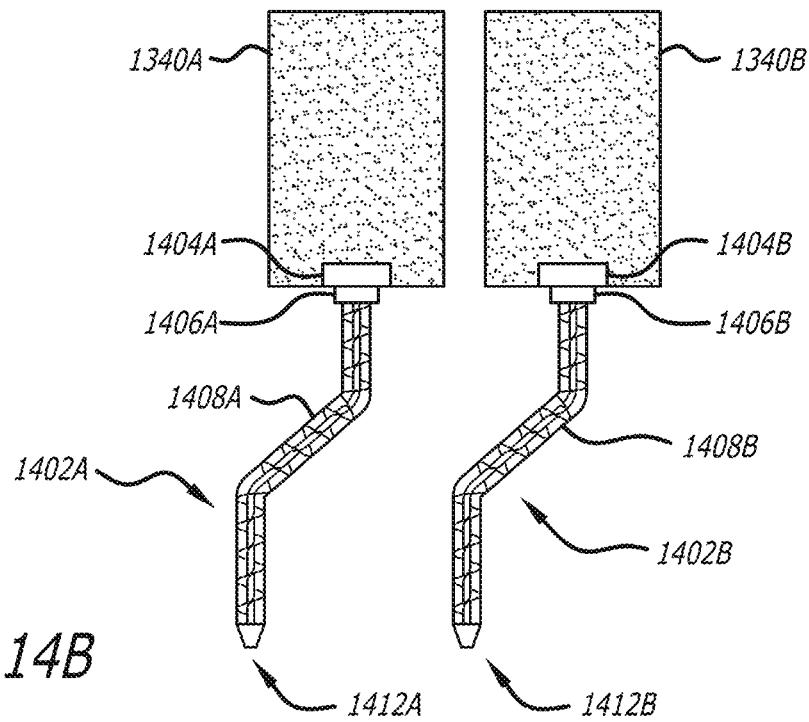
FIG. 14B is an exemplary illustration of a plurality of food cartridges each coupled to a nozzle via a piping including a flexible auger system.

Referring to FIG. 14B, an exemplary illustration of a plurality of food cartridges each coupled to a nozzle via a piping including a flexible auger system is shown. Specifically, in the embodiment illustrated in FIG. 14B, the material within the food silo 1340A is dispensed by the nozzle 1412A and the material within the food silo 1340B is dispensed by the nozzle 1412B.

Referring now to FIG. 15 with reference to FIGS. 13-14B, an exemplary flowchart of operations of a robotic topping mechanism performed during the process of printing an edible object is shown. Each block illustrated in FIG. 15 represents an operation performed in the method 1500 of printing an edible topping by a robotic topping mechanism. At block 1502, one or more logic module ("logic") of the 3D-printer system receives input corresponding to dimensions of an object on a print bed within a printing compartment of the 3D-printer system. In one embodiment, the dimensions may be received via user input (e.g., via wired or wireless transmission subsequent to user input or selection of one of a set of predefined dimensions) or via one or more sensors incorporated into the 3D-printer system.

At block 1504, the 3D-printer system transports the object from a printing compartment to a topping compartment 1340 of the 3D-printer system 1300 as shown in FIGS. 13-14B. The topping compartment 1340 may include a first dispensing unit (e.g., reference numbers 1402B-1410) having an auger-based dispensing mechanism.

At block 1506, the logic generates one or more instructions that including positioning information of the object in order to align the object with the first dispensing unit, as discussed with respect to FIGS. 13A-13C.

At block 1508, one or more processors of the 3D-printer system executes the one or more instructions which cause a motor to move the base of the topping compartment to align the object with the first dispensing unit. At block 1510, a first topping is dispensed via the first dispensing unit. In particular, the execution of the one or more instructions causes activation of a helical rotor 1404B and a motor 1406B coupled to a first silo 1340B and the first auger-based dispensing unit (e.g., comprising a flexible auger 1408B within a flexible tubing 1402B coupling the first silo 1340B to a first nozzle 1410). As a result of the activation of the helical rotor 1404B and motor 1406B, the edible material within the first silo 1340B is pulled into the tubing 1402B and extruded through the nozzle 1410. Additionally, although not shown in the flowchart illustrating of the method 1500, the execution of the one or more instructions may cause the motor to move the base of the toping compartment to align the object with the second dispensing unit and additionally extrude material from a second silo.

At optional block 1512, the 3D-printer system may transport the object from topping compartment to a curing compartment of the 3D-printer system, as seen in FIG. 16. At optional block 1514, a curing mechanism of the 3D-printer system cures at least a portion of the object.

System and Methodology of Integrated Curing of Food Post-Printing 3D-printed objects often need to be cured following printing, or at least a portion thereof needs to be cured. Curing may be generally understood as a method of altering the environment of a 3D-printed object in order to cause the object, or a portion thereof, to move from a first state to a second state. Curing is often thought of as causing a 3D-printed object to harden into a solid object. Curing a 3D-printed object, or a portion thereof, may be advantageous as a cured object may be cooked and/or hardened immediately following printing which may enable a second stage of printing to take place on top of the object, e.g., on an exterior of the object. For example, a first portion of a cupcake, e.g., a base, may be 3D-printed and the ingredients cured immediately following printing in order to cooked any raw ingredients used and cause the base to harden. Following the curing of the cupcake, a second edible material may be printed on top of the base (e.g., frosting or the like), which may be optionally cured in order to be hardened and maintain a specific shape. In one embodiment, various laser wavelengths (e.g., 445 nm, 705 nm and/or 950 nm) may be utilized with different power level settings (0.5 W-2 W) to cure material after printing, especially when the printed material is a homogenous paste or powder. Alternatively, or in addition, infrared (IR) bulk heating may be used to cure (e.g., bake) all printed material.

Referring now to FIG. 16, a first illustrative embodiment of a 3D-printer including an integrated curing mechanism is shown. The 3D-printer system 1600 is shown to include a housing 1602 that at least partially encloses a printing compartment 1606 and a curing compartment 1608. Additionally, the 3D-printer system 1600 includes a base 1604 that extends at least between the printing compartment 1606 and the curing compartment 1608. The base 1604 may be configured to move, as one example, in a treadmill motion such that an object, e.g., object 1614, printed in the printing compartment 1606 can be transported to the curing compartment 1608. Further, within the printing compartment 1606, the 3D-printer system 1600 includes one or more extruders (collectively illustrated as extruder 1612A) coupled to a gantry 1612B. Within the curing compartment 1608, the 3D-printer system 1600 includes a curing mechanism 1616 that is coupled to a support structure 1618. For example, the support structure 1618 provides support for the curing mechanism 1616 and the gantry 1612B. Optionally, a divider 1610B may be located within the support structure 1610A, or coupled thereto. The divider 1610B may be, for example, a roll-up wall, as illustrated. The curing mechanism 1616 may include a plurality of curing components 1620A-1620D. Although four curing components are illustrated, the disclosure is not intended to be so limited such that more or less than four curing components may be included. Additionally, the curing mechanism 1616 may be hingedly secured to the coupling arm 1618 via a ball-joint 1619. The ball-joint 1619 enables the curing mechanism to move via a pitch, yaw or roll, according to one or more instructions executed by one or more processors (e.g., stored within the base 1604). Additionally, a top of the base 1604 may move in a treadmill motion in order to ensure that one or more designated sides of object 1614 are cured.

Referring now to FIG. 17, flowchart of operations performed in curing at least a portion of an edible object during, or subsequent to, the process of printing the edible object using the 3D-printer system of FIG. 16 is shown. Each block illustrated in FIG. 17 represents an operation performed in the method 1700 of curing at least a portion of an edible object during, or subsequent to, the process of printing the edible object. At block 1703, based on execution of one or more instructions (e.g., GCODES and/or MCODES) by one or more processors ("processors") of the 3D-printer system 1600, the one or more extruders print a first portion of an object, wherein the printing is performed in a printing compartment of the 3D-printer system. In one embodiment, the printing compartment may include a gantry that supports the one or more extruders.

At block 1704, based on execution of one or more instructions by the processors, the object is transported to the curing compartment of the 3D-printer system 1600. For example, the object may be transported due to movement of a top layer of the base of the 3D-printer system 1600 moving in a treadmill-like manner.

At block 1706, based on execution of one or more instructions by the processors, a curing component of a curing mechanism is selected and activated. The activation of the curing component is configured to provide a method of curing to the object (e.g., heat, light, radiation, cold, etc.), wherein, as stated above, curing may be generally defined as a method of altering the environment of the object in order to cause the object, or a portion thereof, to move from a first state to a second state.

At optional block 1708, based on execution of one or more instructions by the processors, the object is transported to the printing compartment of the 3D-printer system 1600. For example, the object may be transported due to movement of the top layer of the base of the 3D-printer system 1600 moving in a treadmill-like manner (e.g., in an opposite direction as above with respect to movement from the printing compartment to the curing compartment).

Additionally, at optional block 1710, based on execution of one or more instructions by the processors, the one or more extruders print a second portion of the object, e.g., on an exterior of the first portion that was previously cured.

Accordingly, the disclosure of the present invention is intended to be illustrative, but not limiting, of the scope of the invention, which is set forth in the following claims.

What is claimed is:

1. A three-dimensional (3D) printer system, the system comprising:
    an extruder;
    a housing configured to house the extruder;
    a 3D-printer base including a print bed, the print bed configured to receive material extruded from the extruder; and
    a sensor configured to detect measurements of an object on the print bed;
    a processor; and
    non-transitory, computer-readable medium having stored thereon logic, the logic being executable by the processor to perform operations including:
        receiving data from the sensor pertaining to the detected measurements,
        determining dimensions of the object based on the data, and
        generating printing instructions in accordance with the dimensions of the object.

2. The 3D-printer system of claim 1, further comprising:
    a plurality of sensors coupled to the housing or the extruder, the plurality of sensors including the sensor, wherein the plurality of sensors are configured to obtain data for detection of a location of the object.

3. The 3D-printer system of claim 1, wherein the logic being executable by the processor to perform further operations including:
    detecting a location of the object on the print bed based on the data.

4. The 3D-printer system of claim 1, wherein the sensor is one of a plurality of sensors coupled to the housing or the extruder, and wherein the data is captured by the plurality of sensors and includes two or three dimensional images, and wherein the logic being executable by the processor to perform further operations including:
  detecting a physical attribute of the object on the print bed based on the data.

5. The 3D-printer system of claim 1, further comprising:
  a scale integrated into the print bed, the scale configured to determine a weight of the object.

6. The 3D-printer system of claim 1, wherein the object is comprised of extruded material.

7. The 3D-printer system of claim 1, wherein the sensor is coupled to the extruder or the housing.

8. The 3D-printer system of claim 1, wherein the data received from the sensor is one or more captured images of the object, and
  wherein determining the dimensions of the object includes comparing the one or more captured images to known images.

9. An apparatus for printing, the apparatus comprising:
  an extruder;
  a housing configured to house the extruder;
  a 3D-printer base including a print bed, the print bed configured to receive material extruded from the extruder; and
  a sensor configured to detect measurements of an object on the print bed;
  a processor; and
  non-transitory, computer-readable medium having stored thereon logic, the logic being executable by the processor to perform operations including:
    receiving data from the sensor pertaining to the detected measurements,
    determining dimensions of the object based on the data, and
    generating printing instructions in accordance with the dimensions of the object.

10. The apparatus of claim 9, further comprising:
  a plurality of sensors coupled to the housing or the extruder, the plurality of sensors including the sensor, wherein the plurality of sensors are configured to obtain data for detection of a location of the object.

11. The apparatus of claim 9, wherein the logic being executable by the processor to perform further operations including:
  detecting a location of the object on the print bed based on the data.

12. The apparatus of claim 9, wherein the sensor is one of a plurality of sensors coupled to the housing or the extruder, and wherein the data is captured by the plurality of sensors and includes two or three dimensional images, and wherein the logic being executable by the processor to perform further operations including:
  detecting a physical attribute of the object on the print bed based on the data.

13. The apparatus of claim 9, further comprising:
  a scale integrated into the print bed, the scale configured to determine a weight of the object.

14. The apparatus of claim 9, wherein the object is comprised of extruded material.

15. The apparatus of claim 9, wherein the sensor is coupled to the extruder or the housing.

16. The apparatus of claim 9, wherein the data received from the sensor is one or more captured images of the object, and
  wherein determining the dimensions of the object includes comparing the one or more captured images to known images.

17. A computerized method for printing utilizing a 3D-printer system, the 3D-printer system including an extruder, a housing, a 3D-printer base including a printer bed, and a sensor, the method comprising:
  receiving data from the sensor pertaining to detected measurements of an object placed on the print bed, the sensor being coupled to the housing or the extruder of the 3D-printer system, wherein the housing is configured to house the extruder; and
  determining dimensions of the object based on the data, and
  generating printing instructions in accordance with the dimensions of the object.

18. The computerized method of claim 17, further comprising:
  detecting a physical attribute of the object on the print bed based on the data,
  wherein the sensor is one of a plurality of sensors, and wherein the data is captured by the plurality of sensors and includes two or three dimensional images.

19. The computerized method of claim 17, further comprising:
  receiving measurements from a scale, the scale integrated into the print bed and configured to determine a weight of the object.

20. The computerized method of claim 17, wherein the data received from the sensor is one or more captured images of the object, and wherein determining the dimensions of the object includes comparing the one or more captured images to known images.

* * * * *